(12) United States Patent
Whitney et al.

(10) Patent No.: US 9,415,945 B1
(45) Date of Patent: Aug. 16, 2016

(54) SELF-CLEANING MULTIPLE HELICAL AUGER CONVEYOR FOR A PROCESSOR

(71) Applicants: John Potee Whitney, Dallas, TX (US); Preston Ochas Whitney, Dallas, TX (US)

(72) Inventors: John Potee Whitney, Dallas, TX (US); Preston Ochas Whitney, Dallas, TX (US)

(*) Notice: Subject to any disclaimer, the term of this patent is extended or adjusted under 35 U.S.C. 154(b) by 0 days.

(21) Appl. No.: 14/794,822

(22) Filed: Jul. 9, 2015

(51) Int. Cl.
*B65G 45/10* (2006.01)
*B65G 33/18* (2006.01)
*B65G 45/00* (2006.01)
*B65G 33/26* (2006.01)

(52) U.S. Cl.
CPC .............. *B65G 45/005* (2013.01); *B65G 33/18* (2013.01); *B65G 33/265* (2013.01)

(58) Field of Classification Search
CPC ..... B65G 45/005; B65G 33/18; B65G 33/265
USPC ......................... 198/625, 663, 669
See application file for complete search history.

(56) References Cited

U.S. PATENT DOCUMENTS

| | | | | |
|---|---|---|---|---|
| 2,567,219 A * | 9/1951 | Lesniak | ..................... | B30B 9/16 100/146 |
| 3,549,000 A * | 12/1970 | Christian | ............... | B65G 33/00 198/625 |
| 3,580,389 A * | 5/1971 | Nonnenmacher | ....... | B01F 7/085 165/87 |
| 3,779,522 A * | 12/1973 | Loomans | ................ | B29B 7/483 366/293 |
| 3,782,535 A * | 1/1974 | Yousch | ................ | B65G 45/005 198/498 |
| 3,895,654 A * | 7/1975 | Welzel | ................. | D03D 47/263 139/142 |
| 4,078,653 A * | 3/1978 | Suter | ......................... | F04C 2/16 198/625 |
| 4,590,833 A * | 5/1986 | Hain | ....................... | A01J 27/04 198/625 |
| 5,417,492 A * | 5/1995 | Christian | ................ | C10B 47/44 219/388 |
| 8,739,963 B2 * | 6/2014 | Nickerson | .............. | B65G 33/34 198/604 |

* cited by examiner

*Primary Examiner* — Mark A Deuble
(74) *Attorney, Agent, or Firm* — Finn T. Simmensen

(57) ABSTRACT

A self-cleaning multiple helical auger conveyor for a processor has an array of pairs of opposite-handed, counterroatating helical augers with flights intermeshed such that the front of every flight is cleaned by the back of another flight and the back of every flight is cleaned by the front of another flight. Optionally, the flights are shafted and the periphery of every flight and the shaft of an adjacent flight mutually clean one another. Rectangular and polar arrays of such paired flights are described, along with relationships among flight thickness, clearance, pitch and number of flights. A flight having a coined surface and a cleaning tab projecting therefrom is described. Support, gearing and housing for various embodiments of the conveyor are described.

5 Claims, 15 Drawing Sheets

SELF-CLEANING MULTIPLE HELICAL AUGER CONVEYOR FOR A PROCESSOR

BACKGROUND OF THE INVENTION

1. Field of the Invention

The present invention relates generally to the field of conveyors for urging materials through a processor, more specifically to a conveyor comprising a plurality of augers (also known as screws and as helicoils) enclosed in a housing, especially when such augers are intermeshed to achieve a desired effect upon the processed material given the material's properties.

2. General Background and State of the Art

The inventors perceived that conveyors for processing of viscous feed materials within a housing often suffer from clumping of feed material and adhesion of feed material to the conveyor. The inventors sought to address a need for a helical auger conveyor whose surfaces would not be congested by feed material.

INVENTION SUMMARY

It is an object of the present invention to efficiently urge a material through a processor.

It is another object to efficiently blend, mill, heat or cool such a material.

It another object that the augers interact with one another or with the feed material so as to clean one another while urging the material through a processor. In accordance with these objects and with others which will be described and which will become apparent, an exemplary embodiment of the self-cleaning conveyor in accordance with the present invention comprises a plurality of augers, each of the augers having a flight wound helically about an axis, each of the flights being a member of a pair of flights, the pairs being at least two in number. Flights of each pair are of opposite handedness and are mutually and counter-rotationally intermeshed with respective axes substantially parallel. At least one flight of each pair is mutually and counterrotationally intermeshed with at least one flight of another pair. All of the flights having a common pitch. Each of the flights has a front and a back, the front being approximated at a predetermined first clearance, as projected onto the axes, from a back of another of the flights, the back being approximated at the first clearance from a front of another of the flights. All of the plurality of flights are geared together so as to be rotatable at a common speed and so as to maintain the predetermined first clearance.

Advantageously, every front is cleaned by a back and every back is cleaned by a front. Also advantageously, while every point on every front and every back experiences the close approach of a back (and a front, respectively) often enough to shear away feed material that might otherwise cling, each such point also spends time not closely approximated to any surface of another flight. During such time, feed material tends to flow between flights and tends to be mixed. Also advantageously, heating or cooling may be accomplished if heating or cooling is supplied via the flight or via the housing that encloses the conveyor.

Another exemplary embodiment of the conveyor in accordance with the present invention has a plurality of shafts, each flight being coiled about one of the shafts, each flight having a periphery. As to each pair of flights, each of the peripheries thereof intrudes to within a predetermined second clearance of the adjacent shaft thereof. Advantageously, each flight periphery cleans, and is cleaned by, an adjacent shaft.

In another aspect of the conveyor in accordance with the present invention, a plurality of the pairs of the flights form a polar array of T mutually intermeshed flights comprising n/2 pair of the n mutually intermeshed flights, all of the flights having a common thickness F as projected upon the axis, the first clearance, as projected upon the axis, being denominated C, the pitch P having a maximum pitch value Pmx, a minimum pitch value Pmn or an intermediate pitch value I, the variables T, F, C, Pmx, Pmn and I obeying the mathematical relationships (a), (b) and (c) as follows:

$$Pmn = n(F+C), \qquad (a).$$

n being the smallest number of a factor set, greater than or equal to 3, factored from T, the total number of flights;

$$Pmx = T(F+C), \qquad (b).$$

T being a positive number evenly divisible by 2; and $$I = n(F+C), \qquad (c).$$

there being factors of T, n being selected from among the factors of (a) above other than n≥3 (used for min pitch) or T (used for max pitch).

In another aspect of the conveyor in accordance with the present invention, a plurality of the pairs of the flights forming a rectangular array of T mutually intermeshed flights comprising n/2 pair of the n mutually intermeshed flights, all of the flights having a common thickness F as projected upon the axis, the first clearance, as projected upon the axis, being denominated C, the pitch P having a maximum pitch value Pmx, a minimum pitch value Pmn or an intermediate pitch value I, the variables T, F, C, Pmx, Pmn and I obeying the mathematical relationships (a), (b) and (c) as follows:

(a). Pmn=4(F+C);
(b). Pmx=n(F+C), n being a positive number evenly divisible by 2; and
(c). I=n(F+C), n being a positive number evenly divisible by 2 and greater than or equal to 6; and 2 more than the minimum or 2 less than the maximum.

In another exemplary embodiment of the conveyor in accordance with the present invention, the back of the flights has a coined back surface portion and a tab projecting radially and longitudinally from the coined back surface portion, the tab projecting radially to the outside edge of the flighting and longitudinally to the plane of the back of the flight. Advantageously, the coined back surface portion provides a space internal to the flight within which a heat transfer medium can be circulated to heat or cool the feed material via the flight. Also advantageously, the tab projects to within a close enough approximation to the opposing front that the tab sweeps feed material away from the opposing front, which might otherwise not be reached by the coined back surface portion. Also advantageously, the tab projects radially as well as longitudinally and contributes to sweeping feed material from an adjacent shaft when it passes in close proximity to the shaft.

BRIEF DESCRIPTION OF THE DRAWINGS

For a further understanding of the objects and advantages of the present invention, reference should be had to the following detailed description, taken in conjunction with the accompanying drawing, in which like parts are given like reference numbers and wherein.

DETAILED DESCRIPTION OF THE PREFERRED EMBODIMENTS

Figure 1:
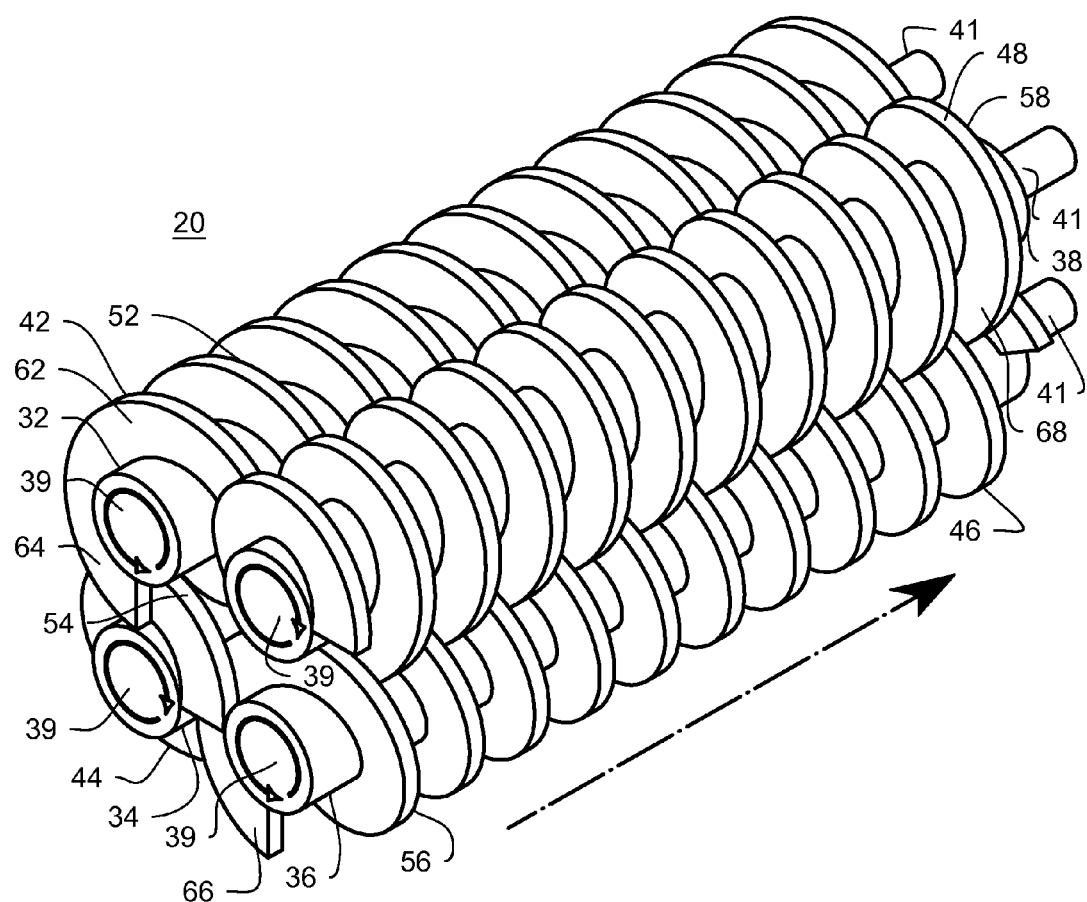
FIG. 1 is a perspective view of a FIRST EXEMPLARY EMBODIMENT of the self-cleaning conveyor in accordance with the present invention.

The invention will now be described with reference to FIG. 1, which illustrates in partial perspective view a FIRST EXEMPLARY EMBODIMENT of the self-cleaning conveyor in accordance with the present invention, shown generally at 20 in the form of a four-auger assembly of a first shaft 32, a second shaft 34, a third shaft 36, and a fourth shaft 38. In the present series of views, it is intended that the conveyor 20 move a material from the viewer's left to right, from foreground to background in perspective. With this stated, "front" should be facing rightward and toward the background, i.e., "going away from us," and "back" should be facing leftward and toward the foreground, i.e., "facing us." Each shaft has a first end and a second end. Helical first through fourth flights 42, 44, 46 and 48 are formed on the first through fourth shafts 32, 34, 36 and 38, respectively and have first through forth front 52, 54, 56 and 58 and first through fourth back 62, 64, 66 and 68. Common to all four of the flights is a flight thickness defined as the distance, e.g., between the first front 52 and the first back 62 as projected upon the longitudinal axis of the first auger and likewise for the other augers. Also common to the first through fourth flight is a pitch defined as the distance between successive windings of, e.g., the first flight 42 as projected upon the longitudinal axis of the first auger, and likewise for the others. Each of the first through fourth flight has a handedness: either right-handed or left-handed. The magnitude of the pitch is the same for all four flights.

With continued reference to FIG. 1, the first ends 39 and the second ends 41 of the shafts are supported so as to hold the first through fourth flights intermeshed in a square configuration. The shafts are geared together and are motor-driven at a common rotational speed, as will be described below and illustrated with reference to subsequent drawing figures.

With continued reference to FIG. 1, the first flight 42 is right-handed, i.e., following the first flight clockwise corresponds to traveling from the viewer's left to right and from the foreground to the background in perspective. As indicated by the circular arrow, from the viewer's perspective, the first flight 42 rotates counterclockwise. The second flight 44, located below the first flight 42, has a left-handed pitch and rotates clockwise. The third flight 46, located to the right of the second flight 44, has a right-handed pitch and rotates counterclockwise. The fourth flight 48, located above the third flight 46 and to the right of the first flight 42, has a left-handed pitch and rotates clockwise.

With continued reference to FIG. 1, the first flight 42 is intermeshed with and adjacent to the second and fourth flights 44 and 48. The second flight 44 is intermeshed with and adjacent to the first and third flights 42 and 46. The third flight 46 is intermeshed with and adjacent to the second and fourth flights 44 and 48. The fourth flight 48 is intermeshed with and adjacent to the third and first flights 46 and 42. The third flight 46 is diagonally opposite the first flight 42. The fourth flight 48 is diagonally opposite the second flight 44. As indicated by the circular arrows, the flights intermeshed to form any pair have opposite handedness and rotate in opposite directions. The term "intermeshed," with reference to the flights of any pair under consideration, means the flighting on one auger intrudes between the flighting of the other auger and approaches the inner diameter of the flighting of the other auger.

With continued reference to FIG. 1, when the shafts rotate, the fronts and backs of all four flights appear to travel in the same longitudinal direction—as shown in the perspective view of FIG. 1, in the direction indicated by the long arrow: from the viewer's left to right and from foreground to background. It will be appreciated that when the four augers are confined along with a liquid, semisolid or granular feed material, the feed material will tend to surround the flights of the augers. When the augers are driven in the directions shown, they will tend to urge the feed material in this same direction of travel, i.e., from the viewer's left to right and from foreground to background.

Figure 2:
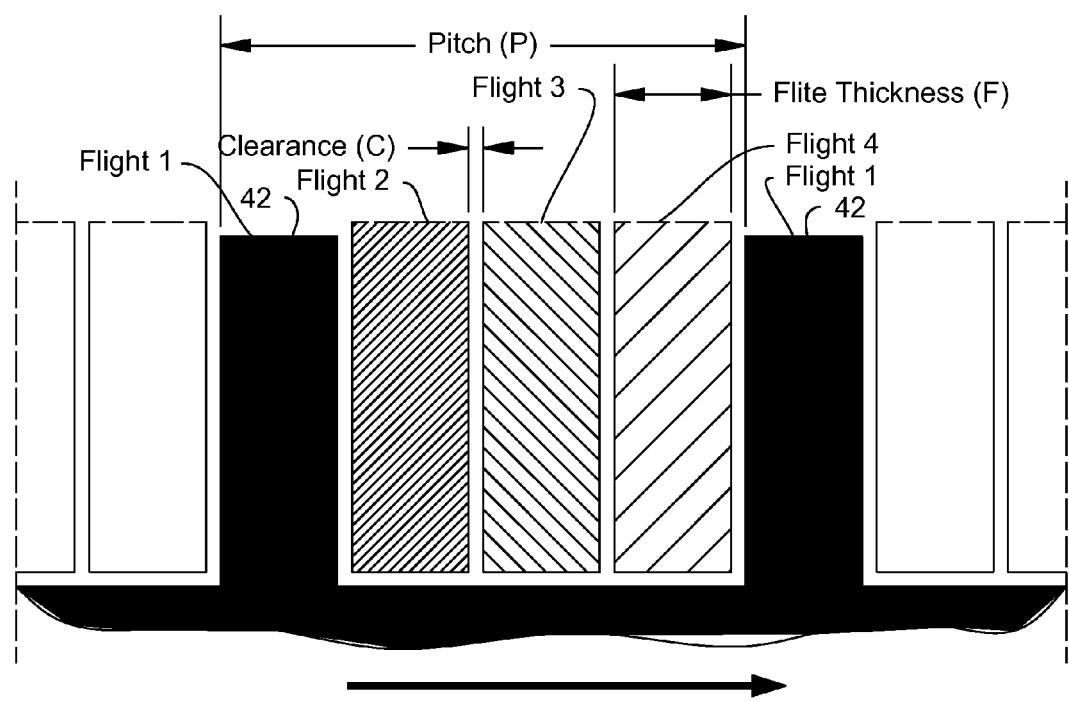
FIG. 2 is a schematic diagram of cumulative flight thicknesses and clearances in the embodiment of FIG. 1.

FIG. 2 is a schematic diagram of how the flight thicknesses and clearances of the flights in the embodiment of FIG. 1 add up as four flights are intermeshed in this array. In normal operation in accordance with the present invention, adjacent augers do not drive one another by means of contact between flights, nor do the flights impinge on one another. Rather, with reference to any pair of flights under consideration, there is a clearance between the front of each flight and the back of the flight with which it is intermeshed. It should be recalled that this clearance is maintained because the shafts of all four augers are geared together. It will be appreciated that, in order for all four flights to be intermeshed without impinging, the thicknesses and clearances must add up so that the fourth flight is intermeshed with the first flight 42 in the same manner as the first flight 42 is intermeshed with the second. Thus, the sum of all the flight thicknesses, each referred to as F, for this array of n flights, n being 4 in this embodiment, plus all the clearances, each referred to as C in this embodiment, is referred to as the pitch, P. This relationship among P, F, C, and n is expressed as P=n(F+C). In this embodiment, n=4. Therefore, P=4(F+C). In FIG. 2, the pitch is shown as the sum of the first flight thickness and clearance, the second flight thickness and clearance, the third flight thickness and clearance, and the fourth flight thickness and clearance. Because both flight thickness and clearance are common in this embodiment, one variable suffices for each.

Figure 3:
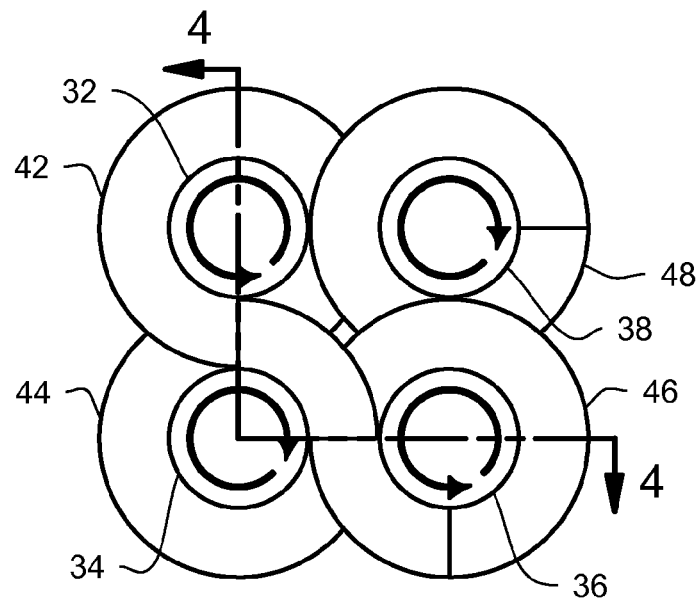
FIG. 3 is an end view of the embodiment of FIG. 1.

FIG. 3, an end view of the embodiment of FIG. 1, shows the first through fourth shafts 32, 34, 36 and 38 and flights 42, 44, 46 and 48 with pitch and rotational directions as shown in FIG. 1. Adjacent flights are intermeshed, each flight extending nearly to the adjacent shaft. In this view, portions of each flight which are occluded by an intervening flight are drawn in dotted lines. Intermeshed flights counterrotate.

Figure 4:
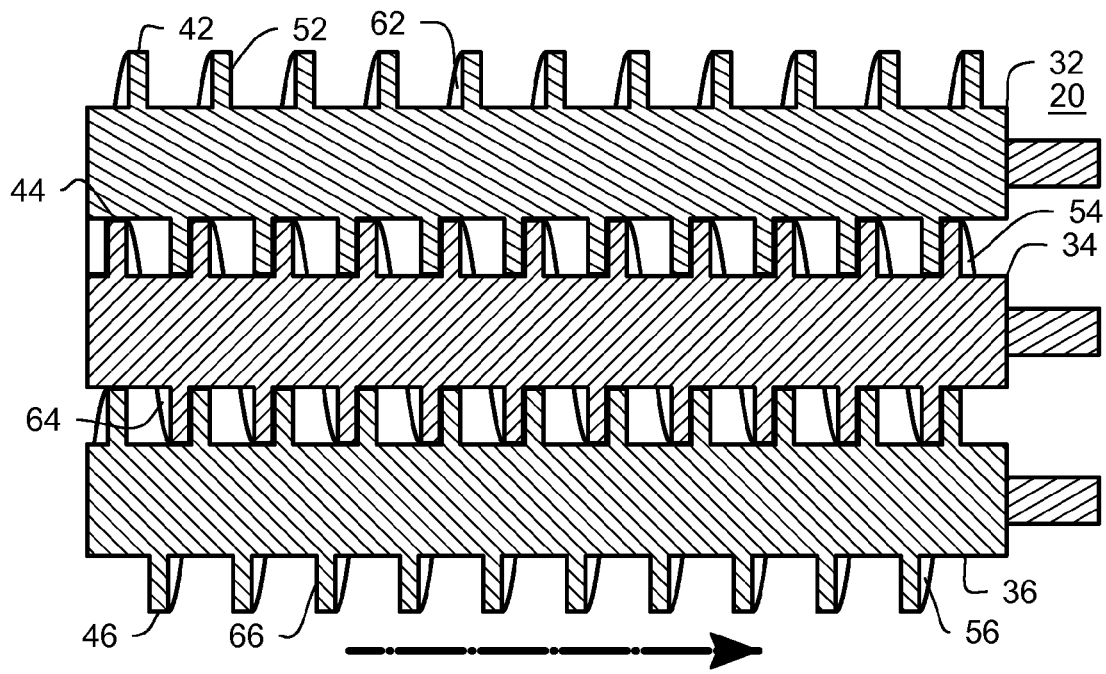
FIG. 4 is a corner sectional view of the embodiment of FIG. 1 along the section lines 4-4 in FIG. 3.

FIG. 4, a corner sectional view of the embodiment of FIG. 1 along the section lines 4-4 in FIG. 3, shows the first, second and third shafts 32, 34, and 36, their flights 42, 44, and 46, and their fronts 52, 54, and 56 and backs 62, 64, and 66. In this view, the intended direction of conveyance is from left to right. Thus, as to each flight, the front is on the right and the back is on the left. Consistent with this description, the first front 52 is shown closely approximated to the second back 64. Likewise, the second front 54 is shown closely approximated to the third back 66. In both cases, the mutual separation between approximated flights is the clearance C, a separation too small to be seen clearly in this view. A liquid or semisolid feed material occupying the space defined between faces closely approximated at this clearance will experience shear and will, therefore, tend not to collect there nor to cling to the approximated surfaces.

With reference again to FIG. 1, in the illustrated four-auger configuration, the first flight 42 and the third flight 46 have right-handed pitch and the second flight 44 and the fourth flight 48 have left-handed pitch.

With particular reference to FIG. 4, the flight of each auger overlaps the flights of two adjacent augers. Where such overlapping occurs, the overlapping flights are closely approximated and self-cleaning occurs, i.e., one flight is cleaned by other flights. As a particular example, as the second front 54 passes behind (to the left of) and in close proximity to the opposing third back 66, any buildup of material on the second front 54 or on the third back 66 tends to be shorn away. With reference to any flight under consideration, the flight's back is cleaned by the front of a flight opposing it from behind and the flight's front is cleaned by the back of a flight opposing it from ahead. With continued reference to FIG. 4, when, as in this embodiment, each flight extends radially nearly to the shaft of each flight it is intermeshed with, any peripheral buildup of material on the shaft or on any flight tends to be shorn off when these respective surfaces overlap in passing. Thus, virtually every surface of all four shafts and all four flights is frequently swept clear of material buildup.

With continued reference to FIG. 4, it will be appreciated that virtually every surface of each shaft and each flight spends only part of the time in an overlapped condition. At other times, surfaces are less closely approximated, leaving space for the material to occupy. More particularly, in FIG. 4, the first back 62 and the second front 54 are less closely approximated; likewise, the second back 64 and the third front 56. Feed material tends to occupy the spaces where fronts are not closely overlapping backs and where flights are not closely overlapping shafts. In such spaces, the rotation of the augers tends to mix the feed material while at the same time conveying the feed material longitudinally in the direction of longitudinal travel of the flights.

Figure 5:
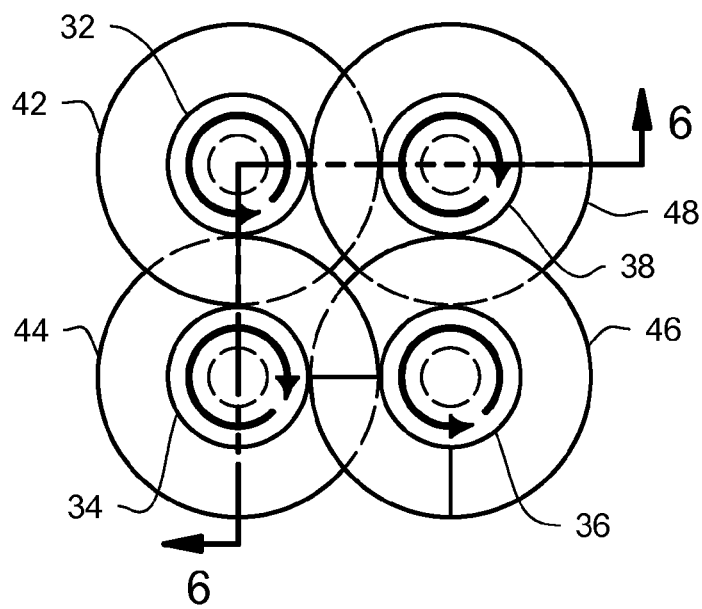
FIG. 5 is a sectional view of the embodiment of FIG. 1 along section lines 5-5 in FIG. 1.

FIG. 5, an end view of the embodiment of FIG. 1, shows the first through fourth shafts 32, 34, 36 and 38 and flights 42, 44, 46 and 48 with pitch and rotational directions as shown in FIG. 1. Adjacent flights are intermeshed, each flight extending nearly to the adjacent shaft. In this view, portions of each flight which are occluded by an intervening flight are drawn in dotted lines. Intermeshed flights counterrotate.

Figure 6:
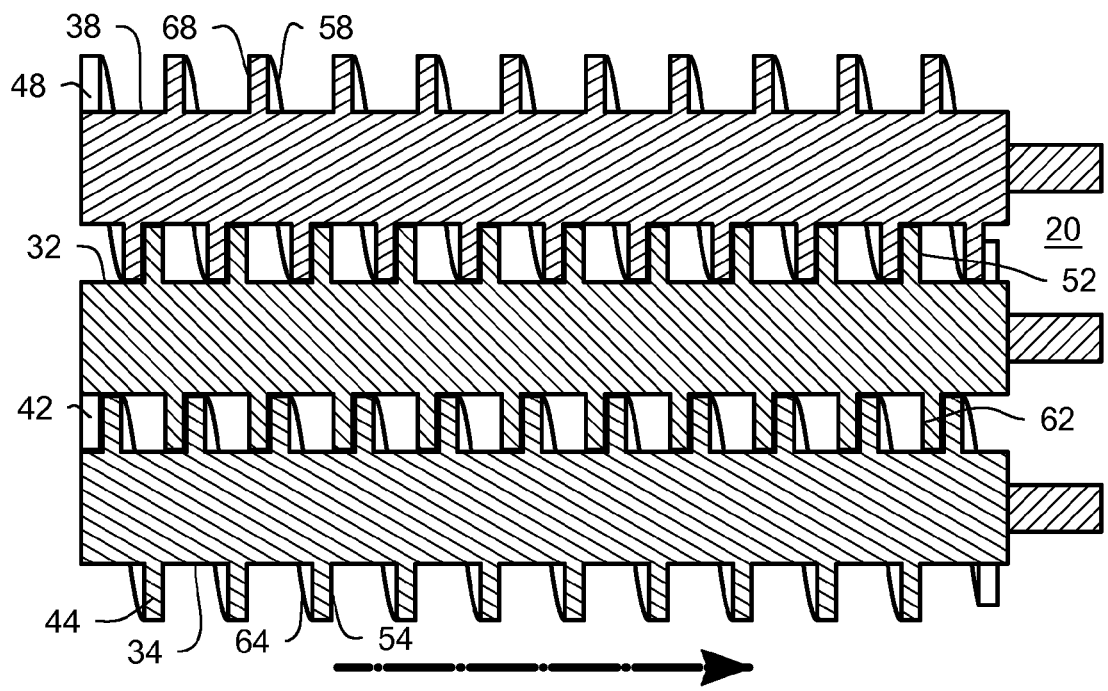
FIG. 6 is a corner sectional view of the embodiment of FIG. 1 along the section lines 6-6 in FIG. 5.

FIG. 6, a corner sectional view of the embodiment of FIG. 1 along the section lines 6-6 in FIG. 5, shows the fourth, first and second shafts 38, 32, 34 and their flights 48, 42, 44, their fronts 58, 52, 54 and their backs 68, 62, 64. As in the previous views, the intended direction of conveyance is from left to right. Each flight has its front facing right and its back facing left. The fourth front 58 is shown closely approximated to the first back 62; likewise, the first front 52 is shown closely approximated to the second back 64, the mutual separation being the clearance C. Cleaning, mixing and conveyance occur in a manner analogous to that described with reference to FIGS. 3-4.

Figure 7:
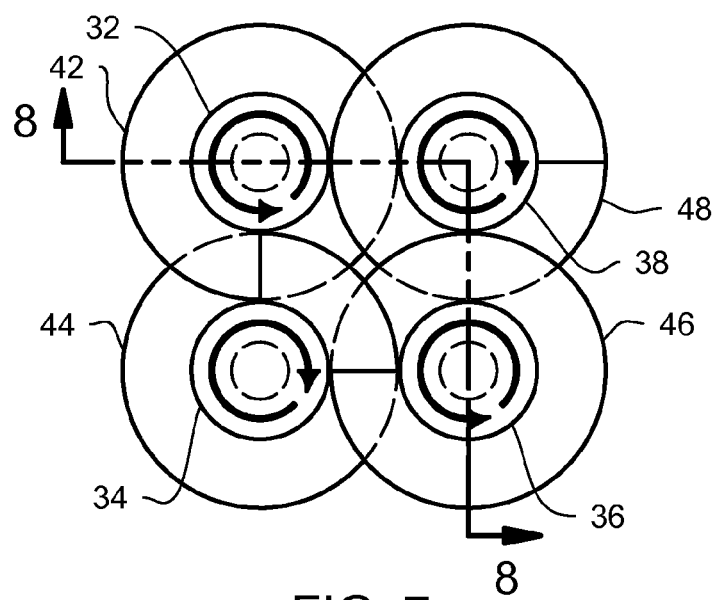
FIG. 7 is a sectional view of the embodiment of FIG. 1 along section lines 7-7 in FIG. 1.

FIG. 7, an end view of the embodiment of FIG. 1, shows the first through fourth shafts 32, 34, 36 and 38 and flights 42, 44, 46 and 48 with pitch and rotational directions as shown in FIG. 1. Adjacent flights are intermeshed, each flight extending nearly to the adjacent shaft. In this view, portions of each flight which are occluded by an intervening flight are drawn in dotted lines. Intermeshed flights counterrotate.

Figure 8:
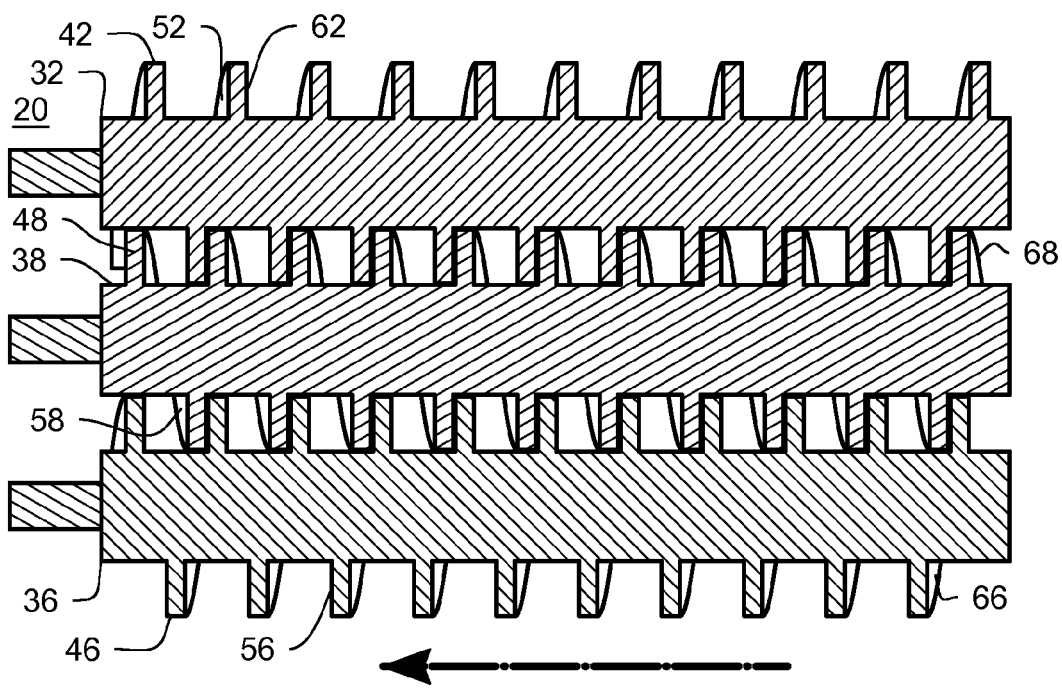
FIG. 8 is a corner sectional view of the embodiment of FIG. 1 along the section lines 8-8 in FIG. 7.

FIG. 8, a corner sectional view of the embodiment of FIG. 1 along the section lines 8-8 in FIG. 7, shows the first, third and fourth shafts 32, 36, 38 and their flights 42, 46, 48, their fronts 52, 56, 58 and their backs 62, 66, 68. Contrary to the previous views, the intended direction of conveyance in this view is from right to left; therefore, each flight has its front facing left and its back facing right. The first back 62 is shown closely approximated to the fourth front 58; likewise, the fourth back 68 is shown closely approximated to the third front 56, the mutual separation being the clearance C. Cleaning, mixing and conveyance occur in a manner analogous to that described with reference to FIGS. 3-4.

Figure 9:
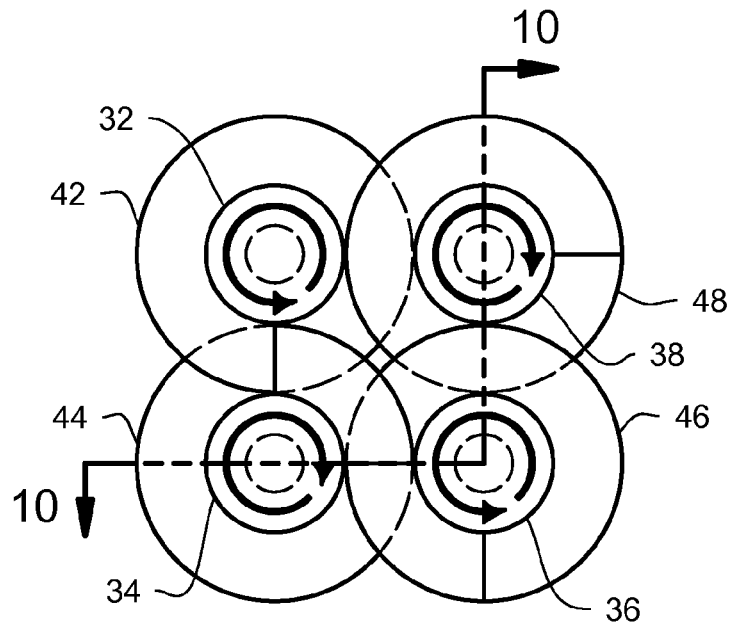
FIG. 9 is a sectional view of the embodiment of FIG. 1 along section lines 9-9 in FIG. 1.
Figure 11:
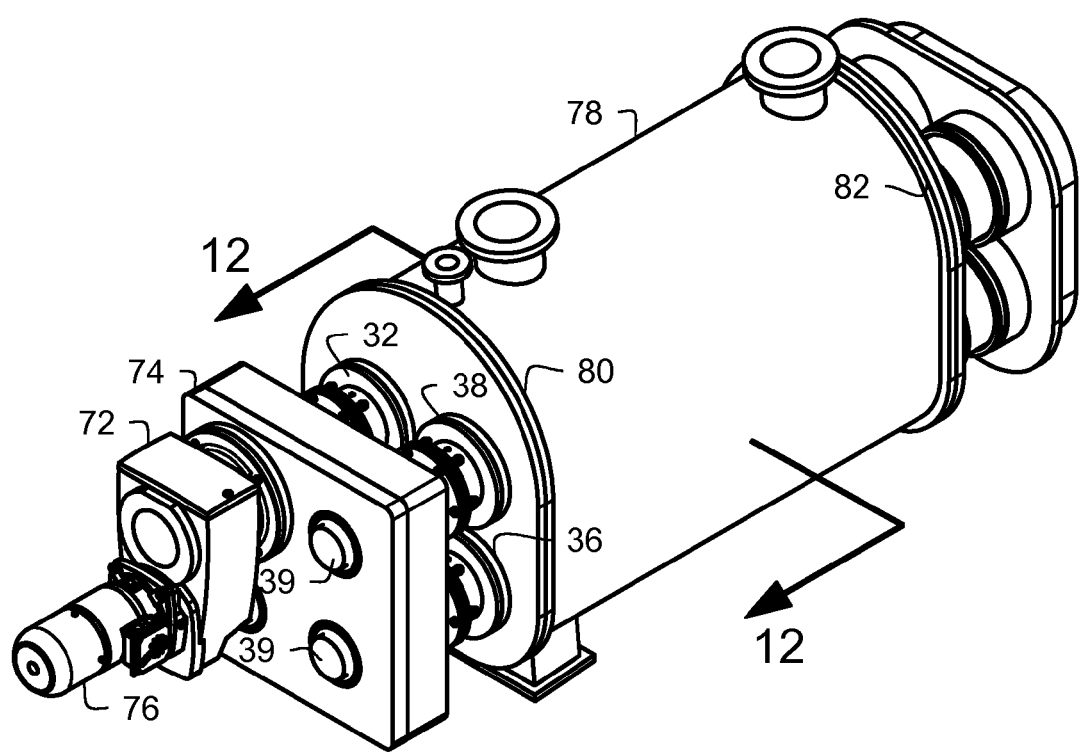
FIG. 11 is a perspective view of a thermal processor employing the above-described FIRST EXEMPLARY EMBODIMENT of the self-cleaning conveyor in accordance with the present invention.

FIG. 9, an end view of the embodiment of FIG. 11, shows the first through fourth shafts 32, 34, 36 and 38 and flights 42, 44, 46 and 48 with pitch and rotational directions as shown in FIG. 1. Adjacent flights are intermeshed, each flight extending nearly to the adjacent shaft. In this view, portions of each flight which are occluded by an intervening flight are drawn in dotted lines. Intermeshed flights counterrotate.

Figure 10:
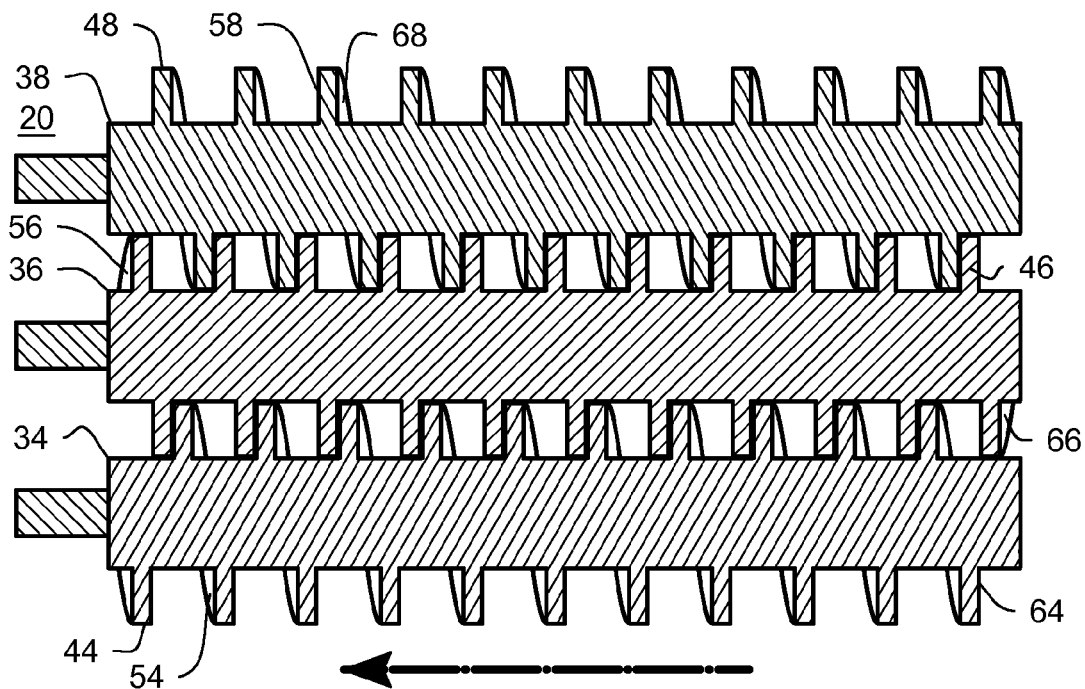
FIG. 10 is a corner sectional view of the embodiment of FIG. 1 along the section lines 10-10 in FIG. 9.

FIG. 10, a corner sectional view of the embodiment of FIG. 1 along the section lines 10-10 in FIG. 9, shows the third, fourth and second shafts 36, 38, 34 and their flights 46, 48, 44, their fronts 56, 58, 54 and their backs 66, 68, 64. In this last of four sectional views, the intended direction of conveyance is again from right to left and again, each flight has its front facing left and its back facing right. The fourth back 68 is shown closely approximated to the third front 56; likewise, the third back 66 is shown closely approximated to the second front 54, the mutual separation being the clearance C. Cleaning, mixing and conveyance occur as described with reference to FIGS. 3-4.

FIG. 11, a perspective view of the above-described FIRST EXEMPLARY EMBODIMENT of the self-cleaning conveyor in accordance with the present invention shows the first ends 39 of the shafts geared together in a gearbox 74 having a drive 72 and a motor 76. Additionally, the four-auger conveyor with flights is not seen in this view, because it is enclosed within a housing 78 having a supportive first bulkhead 80 and a supportive second bulkhead 82. The gearbox is located proximate the first bulkhead. The motor is mounted on the drive, which is mounted on the gearbox. First, third and fourth shafts are shown extending from the first bulkhead to the gearbox.

Figure 12:
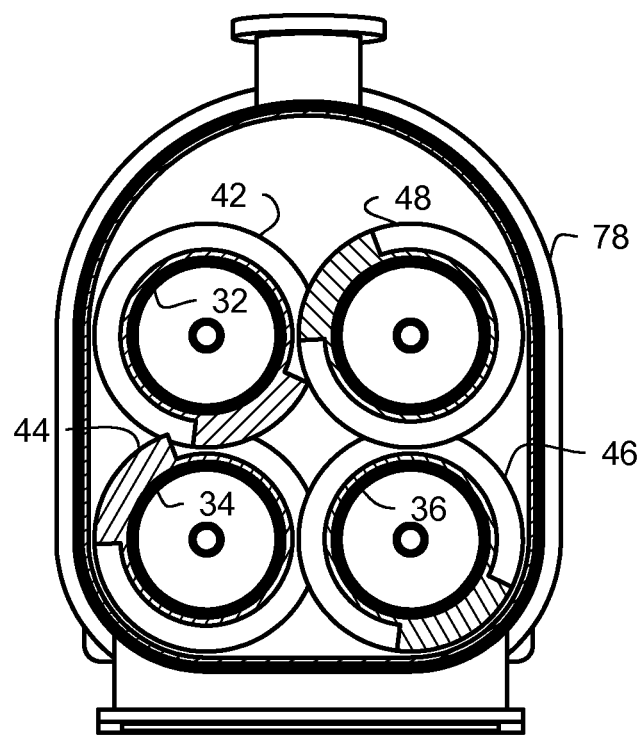
FIG. 12 is a sectional view of the thermal processor shown in FIG. 11 along section lines 12-12 in FIG. 11

FIG. 12, a sectional view of the above-described FIRST EXEMPLARY EMBODIMENT of the self-cleaning conveyor in accordance with the present invention along section lines 12-12 in FIG. 11, shows the four-auger conveyor with first through fourth shafts 32, 34, 36, and 38 and intermeshed first through fourth flights 42, 44, 46, and 48 enclosed in the housing 78.

Figure 13:
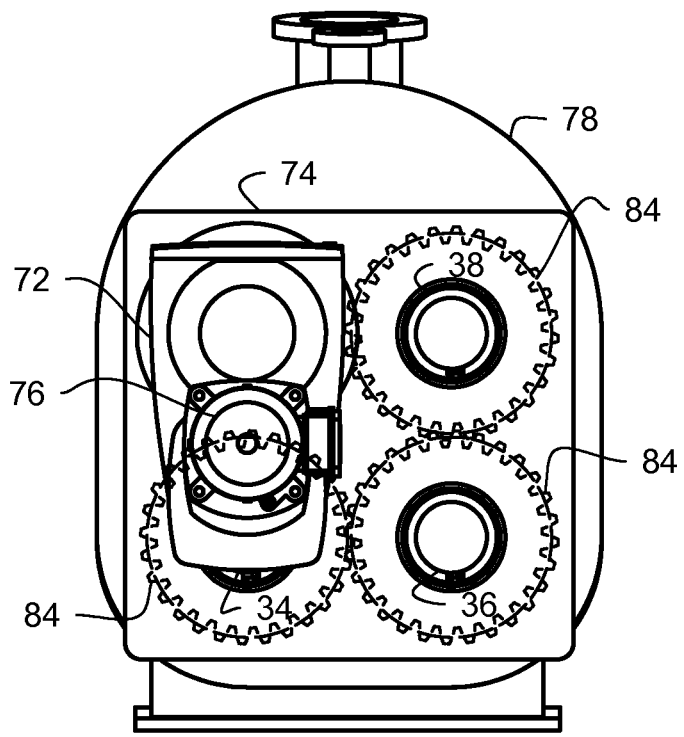
FIG. 13 is a sectional view of the thermal processor shown in FIG. 11 along section lines 13-13 in FIG. 11.

FIG. 13, a detail view of the above-described FIRST EXEMPLARY EMBODIMENT of the self-cleaning conveyor, shows the motor and the gearbox with gears 84 engaged to drive each shaft at a 1:1 rate of rotation relative to the other shafts and to index each shaft at a rotational position relative to adjacent shafts to maintain clearances C between flights where the flights are closely approximated. All four shafts are geared, although only three gears are shown in this view. If desired, additional drives may be added to any of the other shafts.

With reference to embodiments of the present invention generally, the self-cleaning function is accomplished either in a polar array of augers or in a rectangular array of augers, provided that the correct relationship is maintained between pitch, flight thickness, clearance, and the number of augers.

In an exemplary embodiment of the self-cleaning conveyor in accordance with the present invention, the shafts and flights are formed of 836 carbon steel or 304 stainless steel. A shafted auger has a shaft diameter (or flight inner diameter in the case of a shaftless flight) of 6 inches, from which the flights extend radially an additional 3.5 inches. Flights thickness 1 inch, although half inch or quarter inch is more common. The flights are from about 8 to about 20 feet in length. The surfaces of closely approximated flights approach to about 0.25 inch for some uses, preferably as closely as 0.125 inch. Where a flight is closely approximated to a shaft, the flight-shaft distance is about 0.5 inch. A gap between a flight and the housing that encloses the conveyor is about 0.5 inch.

Figure 14:
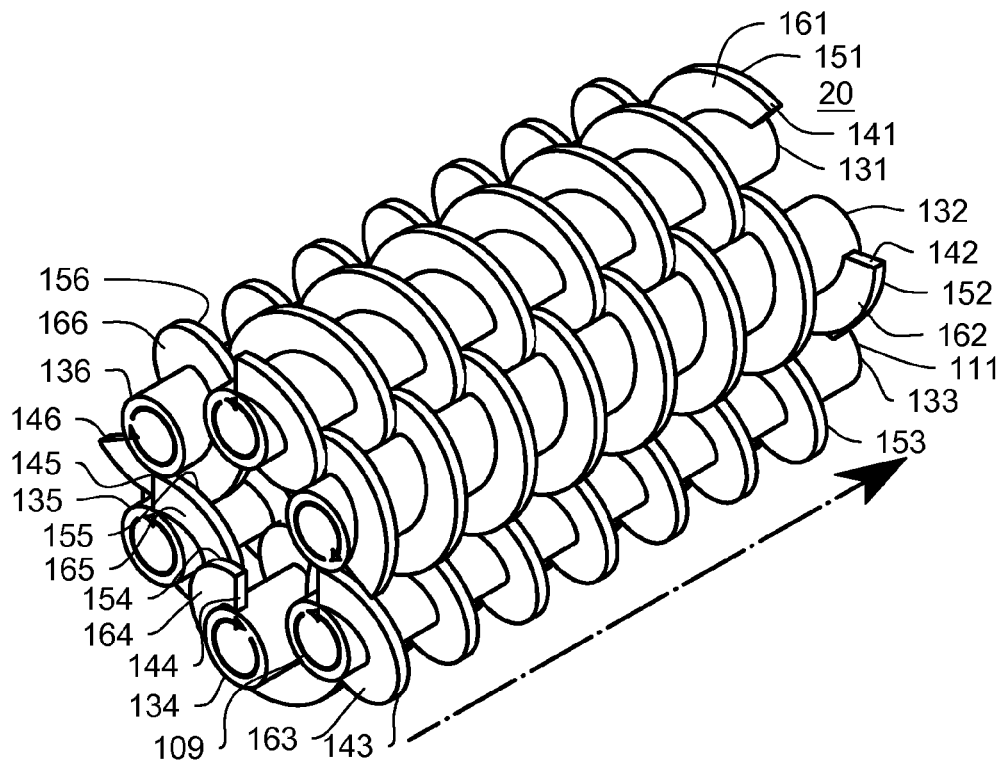
FIG. 14 is a perspective view of view a SECOND EXEMPLARY EMBODIMENT of the self-cleaning conveyor in accordance with the present invention.

FIG. 14, a perspective view a SECOND EXEMPLARY EMBODIMENT of the self-cleaning conveyor in accordance with the present invention, shown generally at 20, shows a six-auger polar array with first through sixth shafts 131, 132, 133, 134, 135, 136 having first throught sixth flights 141, 142, 143, 144, 145, 146, first through sixth fronts 151, 152, 153, 154, 155, 156 and first through sixth backs 161, 162, 163, 164, 165, 166. In the present series of views, it is intended that the conveyor 20 move a material from the viewer's bottom to top, from background to foreground in perspective. Each shaft has a first end 39 and a second end 41. Helical first through sixth flights 141, 142, 143, 144, 145, 146 are formed on the first through sixth shafts 131, 132, 133, 134, 135, 136, respectively and have first through sixth front 151, 152, 153, 154, 155, 156 and first through sixth back 161, 162, 163, 164, 165, 166. Common to all six of the flights is a flight thickness defined as the distance, e.g., between the first front 151 and the first back 161 as projected upon the longitudinal axis of the first auger and likewise for the other augers. Also common to all six of the flights is a pitch defined as the distance between successive windings of, e.g., the first flight 141 as projected upon the longitudinal axis of the first flight 141, and likewise for the other flights. Each of the first flight 141 through sixth flight 146 has a handedness: either right-handed or left-handed. The magnitude of the pitch is the same for all six flights.

With continued reference to FIG. 14, the first ends 109 and the second ends 111 of the shafts are supported so as to hold the flights intermeshed in a hexagonal configuration. The shafts are geared together and are motor-driven at a common rotational speed as will be described below and illustrated with reference to subsequent drawing figures.

With continued reference to FIG. 14, the first flight 141 is right-handed, i.e., following the first flight clockwise corresponds to traveling from the viewer's left to right and from the foreground to the background in perspective. As indicated by the circular arrow, from the viewer's perspective, the first flight 141 rotates counterclockwise. The second flight 142, located clockwise relative to the first flight 141 in this view, has a left-handed pitch and rotates clockwise. Throughout the polar array, adjacent flights have opposite handedness and opposite directions of rotation. Completing the polar array, the sixth flight 146, located counterclockwise relatiive to the first flight 141, has a left-handed pitch and rotates clockwise.

With continued reference to FIG. 14, each flight is intermeshed with and one flight located relatively clockwise in the polar array and one flight located relatively counterclockwise in the polar array. As indicated by the circular arrows, the flights intermeshed to form any pair under consideration have opposite handedness and rotate in opposite directions. The term "intermeshed," with reference to the flights of any pair under consideration, means the flighting on one auger intrudes between the flighting of the other auger and approaches the inner diameter of the flighting of the other auger.

With continued reference to FIG. 14, when the shafts rotate, the fronts and backs of all six flights appear to travel in the same longitudinal direction—as shown in this perspective view, from the viewer's left to right and from foreground to background. It will be appreciated that when the six-auger conveyor is confined along with a liquid, semisolid or granular feed material, the feed material will tend to surround the flights. When the flights are driven in the directions shown, they will tend to urge the feed material in this same direction of travel, i.e., from the viewer's left to right and from foreground to background.

Figure 15:
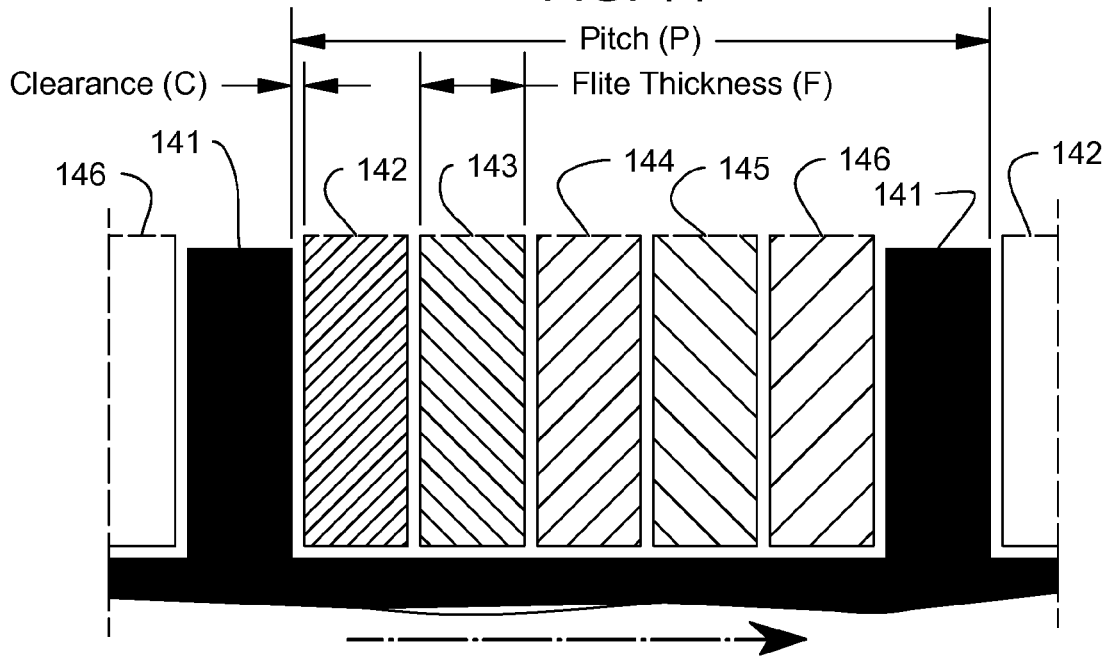
FIG. 15 is a schematic diagram of cumulative flight thicknesses and clearances in the embodiment of FIG. 14.

FIG. 15 is a schematic diagram of how the flight thicknesses and clearances of the flights in the embodiment of FIG. 14 add up as six flights are intermeshed in this polar array. In normal operation in accordance with the present invention, adjacent augers do not drive one another by means of contact between flights, nor do the flights impinge on one another. Rather, with reference to any pair of flights under consideration, there is a clearance between the front of each flight and the back of the flight with which it is intermeshed. It should be recalled that this clearance is maintained because the shafts of all six augers are geared together. It will be appreciated that, in order for all six flights to be intermeshed without impinging, the thicknesses and clearances must add up so that the sixth flight is intermeshed with the first flight in the same manner as the first flight is intermeshed with the second flight. Thus, the sum of all the flight thicknesses, each referred to as F, for this polar array of n flights, n being 6 in this embodiment, plus all the clearances, each referred to as C in this embodiment, is referred to as the pitch, P. This relationship among P, F, C, and n is expressed as P=n(F+C). In this embodiment, n=6. Therefore, P=6(F+C). In FIG. 15, the pitch is shown as the sum of the first through sixth flight thickness and the first through sixth clearance. For convenient reference, thicknesses are associated with the first through sixth flights by the reference numbers 141, 142, 143, 144, 145, and 146, although it should be remembered that FIG. 15 is only a schematic representation.

Figure 16:
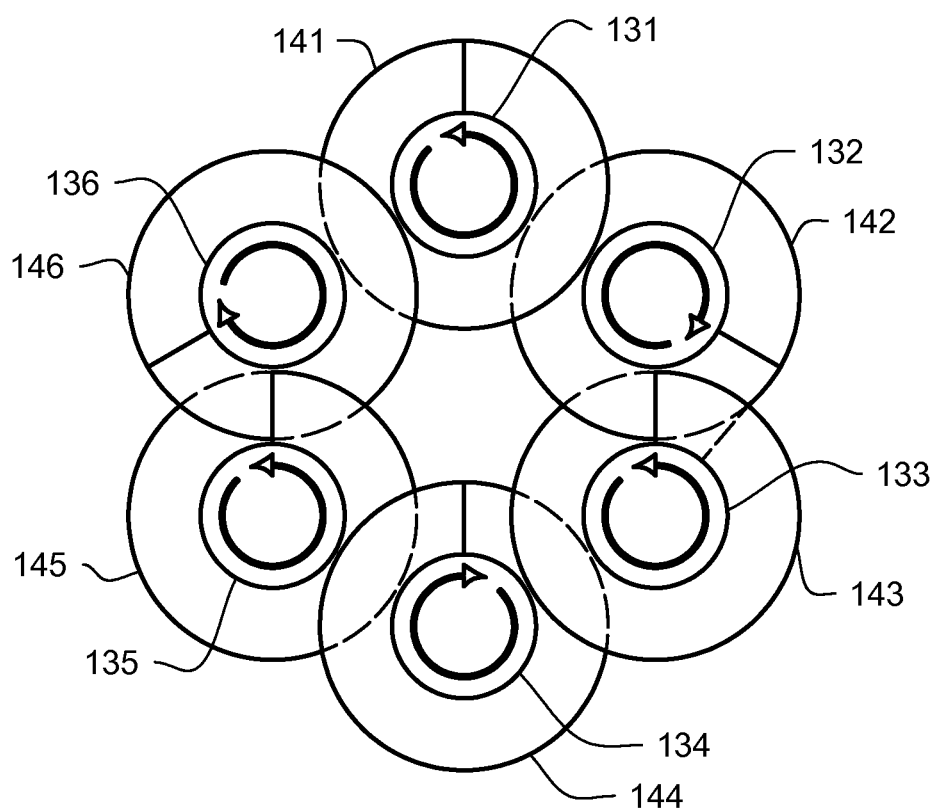
FIG. 16 is an end view of the embodiment of FIG. 14.

FIG. 16, an end view of the embodiment of FIG. 14, shows the first through sixth shafts 131, 132, 133, 134, 135, 136 and flights 141, 142, 143, 144, 145, 146 with pitch and rotational directions as shown in FIG. 14. Adjacent flights are intermeshed, each flight extending nearly to the adjacent shaft. In this view, portions of each flight which are occluded by an intervening flight are drawn in dotted lines. Intermeshed flights counterrotate.

Figure 17:
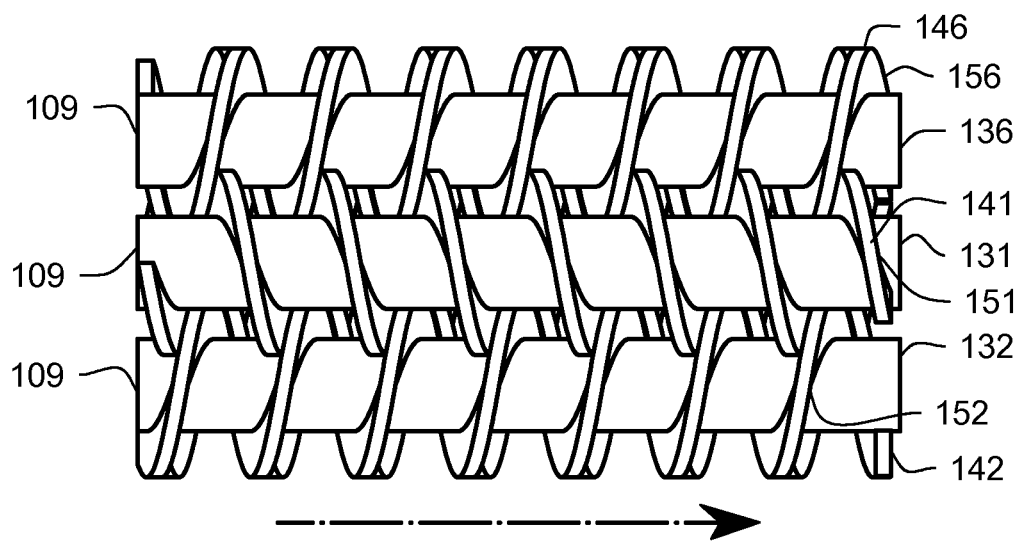
FIG. 17 is a side elevational view of the embodiment of FIG. 14 along section lines 17-17 in FIG. 14.

Although the reader will be spared an exhaustive explication and set of views of the six-auger polar array, one side view is helpful. FIG. 17 is a top plan view of the embodiment of FIG. 14, looking down toward the center of the array from above the first flight 141. The first front is closely approximated to the second back, while the first back is spaced apart from the second front. Similarly, the sixth front is closely approximated to the first back, while the sixth back is spaced apart from the first front. Another way to state this would be with reference to FIG. 14 to note that, stepping around the array from auger to auger in clockwise direction, each front is closely approximated to the back of its clockwise neighbor. However, the pitch being the sum of six thicknesses and six clearances and thus far greater than one thickness and one clearance, this leaves a relatively large distance between the back of the flight under consideration and the front of the same clockwise neighbor.

With continued reference to FIG. 17 and again to FIG. 14, the intended direction of conveyance being from left to right and foreground to background, it will be noted that as to each flight, the front is on the right, in the background, facing away from the viewer (FIG. 14) and the back is on the left, in the foreground, facing toward the viewer. In this six-auger polar array, the front of each flight is closely approximated to the back of the flight of its clockwise neighbor, and its back is closely approximated to the front of the flight of its counterclockwise neighbor. Then, consistent with this description, the first front is shown closely approximated to the second back; likewise, the sixth front is shown closely approximated to the first back, the mutual separation being the clearance C, a separation too small to be seen clearly in this view. A liquid or semisolid feed material occupying the space defined between faces closely approximated at this clearance will experience shear and will, therefore, tend not to collect there nor to cling to the approximated surfaces.

With particular reference to FIG. 16, the flight of each auger overlaps the flights of two adjacent augers. Where such overlapping occurs, the overlapping flights are closely approximated and self-cleaning occurs, i.e., each flight is cleaned by other flights. In particular, as the first front passes behind (underneath, in the background of) and in close proximity to the opposing second back, any buildup of material on the on the first front or on the second back tends to be shorn away. With reference to any flight under consideration, the flight's back is cleaned by the front of a flight opposing it from behind and the flight's front is cleaned by the back of a flight opposing it from ahead. With continued reference to FIG. 16, when, as in this embodiment, each flight extends radially nearly to the shaft of each flight it is intermeshed with, any peripheral buildup of material on a shaft or on a flight tends to be shorn off when these respective surfaces overlap in passing. Thus, virtually every surface of all six shafts and all six flights is frequently swept clear of feed material.

With continued reference to FIG. 16, it will be appreciated that virtually every surface of each shaft and each flight spends only part of the time in an overlapped condition. At other times, surfaces are less closely approximated, leaving space for the material to occupy. More particularly, in FIG. 16 and also in FIG. 17, the first back and the second front are less closely approximated; likewise, the sixth back and the first front, and so on, all around the array. Feed material tends to occupy the spaces where fronts are not closely overlapping backs and where flights are not closely overlapping shafts. In such spaces, the rotation of the augers tends to mix the feed material while at the same time conveying the feed material longitudinally in the direction of longitudinal travel of the flights.

With reference to the SECOND EMBODIMENT, it should be understood that, in a manner analogous to that described with reference to the FIRST EMBODIMENT and FIGS. 11-13, the first ends of the shafts are geared together in a gearbox having a drive and a motor. The six-auger conveyor, like the four-auger conveyor, is enclosed within a housing having a supportive first bulkhead and a supportive second bulkhead. The gearbox is located proximate the first bulkhead. The motor is mounted on the drive, which is mounted on the gearbox. Ends of shafts extend from the first bulkhead to the gearbox. The gears engaged to drive each shaft at a 1:1 rate of rotation relative to the other shafts and to index each shaft at a rotational position relative to adjacent shafts to maintain clearances C between flights where the flights are closely approximated. As with the FIRST EMBODIMENT, all shafts are geared and additional drives may be added.

With reference to embodiments of the present invention generally, the self-cleaning function is accomplished either in a polar array of augers or in a rectangular array of augers, provided that the correct relationship is maintained between pitch, flight thickness, clearance, and the number of augers.

The invention will now be described with reference to FIG. 18, which illustrates in perspective view a THIRD EXEMPLARY EMBODIMENT of the self-cleaning conveyor in accordance with the present invention, shown generally at 20 in the form of a ten-auger assembly of first through tenth shaft 231-240, first through tenth flights 241-250, first through tenth fronts 251-260 and first through tenth backs 261-270. In the present series of views, it is intended that the conveyor 20 move a material from the viewer's left to right, from foreground to background in perspective. Each shaft has a first end 39 and a second end 41. Helical flights 241-250 are formed on shafts 231-240 and have fronts 251-260 and backs 261-270. As in the FIRST EXEMPLARY EMBODIMENT, the flight thickness, clearance and pitch are common throughout the conveyor. Each of the first through tenth flights 241-250 is either right-handed or left-handed, the pitch being of the same magnitude throughout the conveyor.

Figure 18:
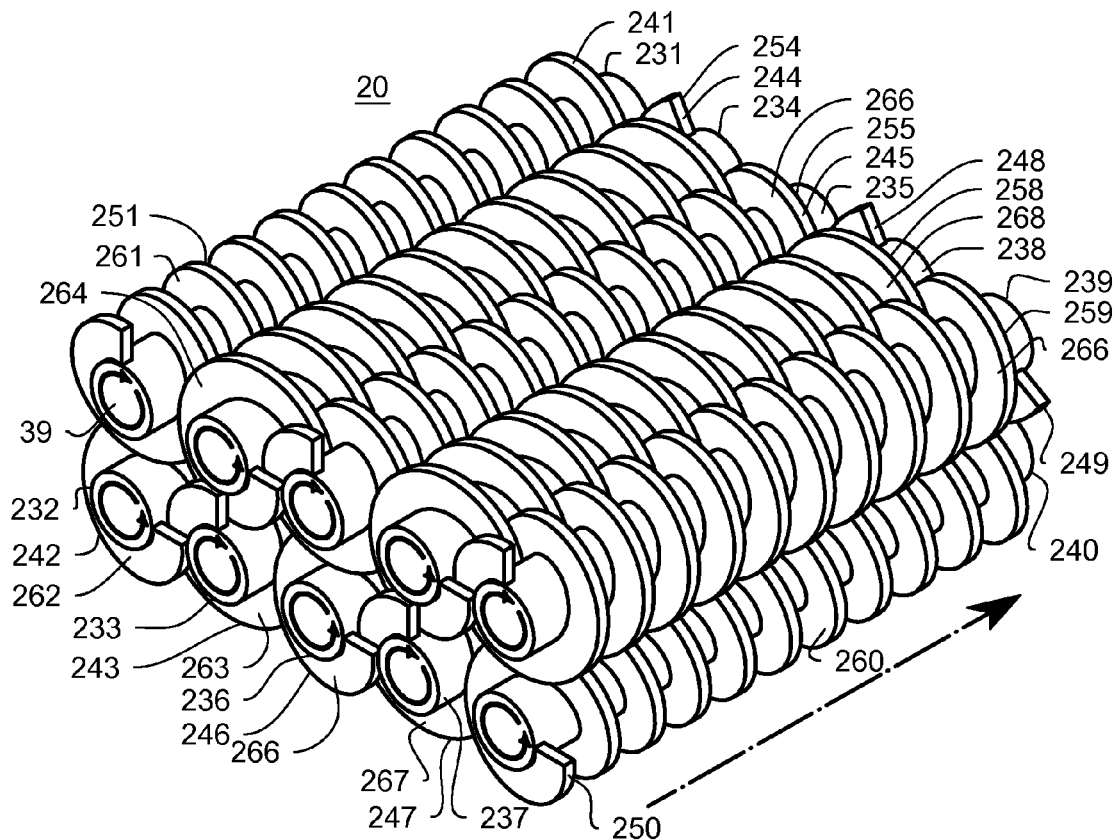
FIG. 18 is a perspective view of a THIRD EXEMPLARY EMBODIMENT of the self-cleaning conveyor in accordance with the present invention.

With continued reference to FIG. 18, the first ends 39 and the second ends 41 of the shafts are supported so as to hold the flights intermeshed in a rectangular configuration having five columns and two rows. The shafts are geared together and are motor-driven at a common rotational speed.

With continued reference to FIG. 18, the first flight 241 is left-handed, i.e., following the first flight counterclockwise corresponds to traveling from the viewer's left to right and from the foreground to the background in perspective. As indicated by the circular arrow, from the viewer's perspective, the first flight 241 rotates clockwise. The second flight 242, located below the first flight 241, has a right-handed pitch and rotates counterclockwise. The third flight 243, located to the right of the second flight 242, has a left-handed pitch and rotates clockwise. The fourth flight 244, located above the third flight 243 and to the right of the first flight 241, has a right-handed pitch and rotates counterclockwise.

With continued reference to FIG. 18, the first flight 241 is intermeshed with and adjacent to the second and fourth flights 242 and 244. The second flight 242 is intermeshed with and adjacent to the first and third flights 241 and 243. The third flight 243 is intermeshed with and adjacent to the second and fourth flights 242 and 244. The fourth flight 244 is intermeshed with and adjacent to the third and first flights 243 and 241. The third flight 242 is diagonally opposite the first flight 241. The fourth flight 244 is diagonally opposite the second flight 242. As indicated by the circular arrows, the flights intermeshed to form any pair have opposite handedness and rotate in opposite directions. The term "intermeshed," with reference to the flights of any pair under consideration, means the flighting on one auger intrudes between the flighting of the other auger and approaches the inner diameter of the flighting of the other auger.

With continued reference to FIG. 18, the above arrangement can be envisioned as a four-auger array with an additional three pair of augers added laterally, to constitute a five-pair, ten auger array. The two augers of any pair under consideration are opposite-handed and counterrotating.

With continued reference to FIG. 18, when the shafts rotate, the fronts and backs of all ten flights appear to travel in the same longitudinal direction—as shown in the perspective view of FIG. 18, in the direction indicated by the long arrow: from the viewer's left to right and from foreground to background. It will be appreciated that when this ten-auger conveyor is confined along with a liquid, semisolid or granular feed material, the feed material will tend to surround the flights and shafts. When the flights are driven in the directions shown, they will tend to urge the feed material in this same direction of travel, i.e., from the viewer's left to right and from foreground to background.

Figure 19:
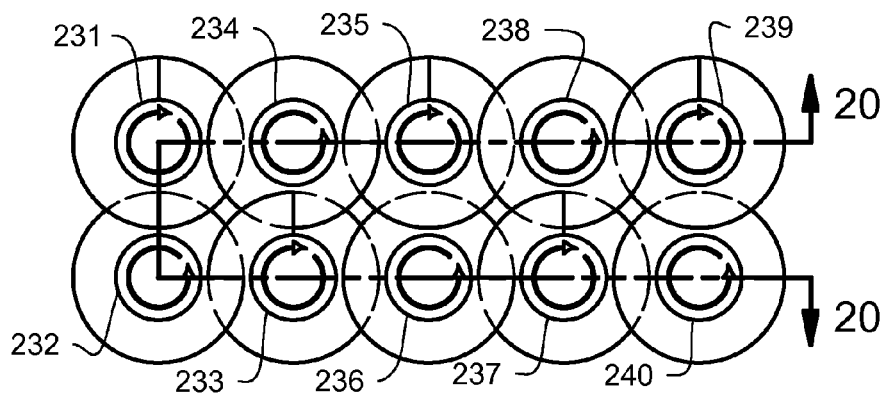
FIG. 19 is an end view of the embodiment of FIG. 18.

FIG. 19, an end view of the embodiment of FIG. 18, shows the first through tenth shafts 231-240 and first through tenth flights 241-250 with pitch and rotational directions as shown in FIG. 18. Adjacent flights are intermeshed, each flight extending nearly to the adjacent shaft. In this view, portions of each flight which are occluded by an intervening flight are drawn in dotted lines. Intermeshed flights counterrotate.

Figure 20:
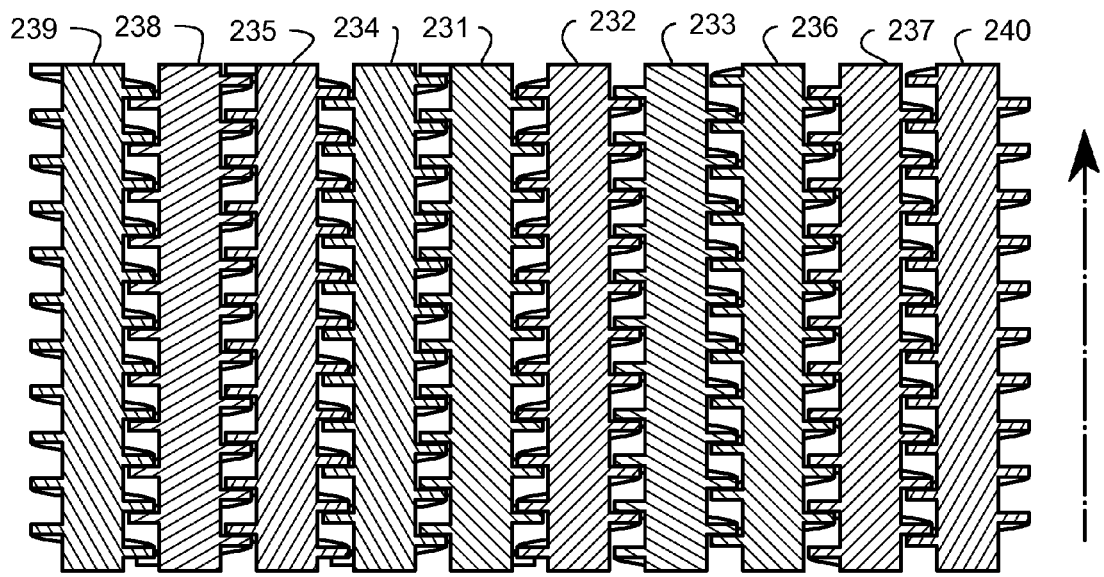
FIG. 20 is a sectional view of the embodiment of FIG. 18 along section lines 20-20 in FIG. 21.

FIG. 20, a sectional view of the embodiment of FIG. 18 along the section lines 20-20 in FIG. 18, shows all ten shafts, their flights, their fronts, and their backs. In this view, the intended direction of conveyance is from bottom to top. As to each flight, the front is on the top and the back is on the bottom.

Figure 21:
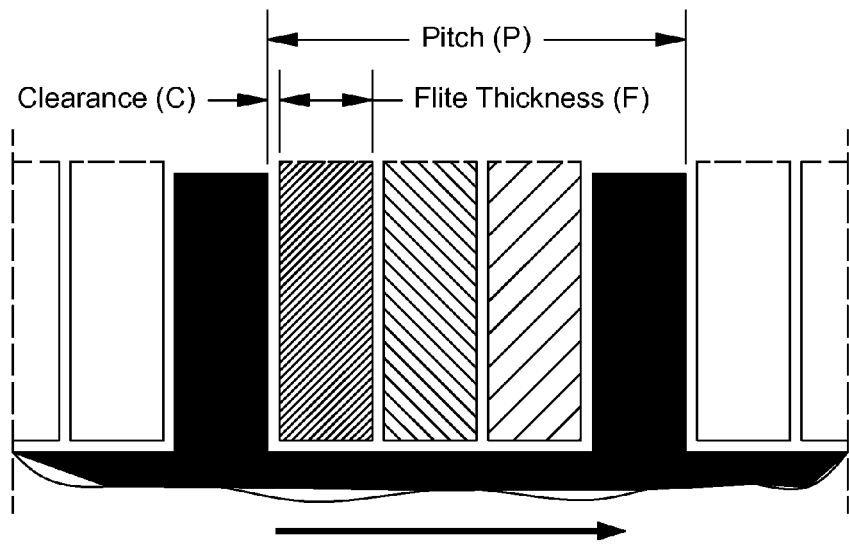
FIG. 21 is a schematic diagram of how the flight thicknesses and clearances of the flights in the embodiment of FIG. 18 add up.

FIG. 21 is a schematic diagram of how the flight thicknesses and clearances of the flights in the embodiment of FIGS. 18-20 add up as four flights are intermeshed in the four-auger sub-arrays that constitute part of this array and three pair of augers are added to complete the ten-auger array. In normal operation in accordance with the present invention, adjacent augers do not drive one another by means of contact between flights, nor do the flights impinge on one another. Rather, with reference to any pair of flights under consideration, there is a clearance between the front of each flight and the back of the flight with which it is intermeshed. It should be recalled that this clearance is maintained because the shafts of all ten augers are geared together. It will be appreciated that, in order for all ten flights to be mutually intermeshed in pairs without impinging, the thicknesses and clearances must add up so that the fourth flight is intermeshed with the first flight 241 in the same manner as the first flight 241 is intermeshed with the second, the the eighth flight 248 is intermeshed with the fifth flight 245 in the same manner as the fifth flight 245 is intermeshed with the sixth flight 246, and so on as to any closed four-aurger path one might follow in the conveyor. Thus, the sum of all the flight thicknesses, each referred to as F, for this array of n flights, n being 4 in this embodiment, plus all the clearances, each referred to as C in this embodiment, is referred to as the pitch, P. This relationship among P, F, C, and n is expressed as $P=n(F+C)$. In this embodiment, n=4. Therefore, $P=4(F+C)$. In FIG. 21, the pitch is shown as the sum of the first flight thickness and clearance, the second flight thickness and clearance, the third flight thickness and clearance, and the fourth flight thickness and clearance. For convenient reference, thicknesses are associated with the fourth through tenth flights by the reference numbers 244-250 for one path chosen through the array, although it should be remembered that FIG. 21 is only a schematic representation. With reference again to FIG. 18 and FIG. 20, the first front 251 is shown closely approximated to the second back 262; likewise, the fourth front 254 is shown closely approximated to the fifth back 265, the mutual separation being the clearance C, a separation too small to be seen clearly in this view. A liquid or semisolid feed material occupying the space defined between faces closely approximated at this clearance will experience shear and will, therefore, tend not to collect there nor to cling to the approximated surfaces.

With continued reference to FIG. 18 and FIG. 20, in the illustrated ten-auger configuration, the first, third, fifth, seventh and ninth flights 241, 243, 245, 247, and 249 have left-handed pitch and the second, fourth, sixth, eighth and tenth flights 242, 244, 246, 248, and 250 have right-handed pitch.

With particular reference to FIG. 20, the flight of each auger overlaps the flights of two adjacent augers. Where such overlapping occurs, the overlapping flights are closely approximated and self-cleaning occurs, i.e., one flight of the conveyor 20 is cleaned by other flights of the conveyor 20. In particular, as the first front 251 passes behind and in close proximity to the opposing second back 262, any buildup of material on either of these surfaces tends to be shorn away. With reference to any flight under consideration, the flight's back is cleaned by the front of a flight opposing it from behind and the flight's front is cleaned by the back of a flight opposing it from ahead. With continued reference to FIG. 20, when, as in this embodiment, each flight extends radially nearly to the shaft of each flight it is intermeshed with, any peripheral buildup of material on the shaft or on any flight tends to be shorn off when these respective surfaces overlap in passing. Thus, virtually every surface of all four shafts and all four flights is frequently swept clear of material buildup.

With continued reference to FIG. 20, it will be appreciated that virtually every surface of each shaft and each flight spends only part of the time in an overlapped condition. At other times, surfaces are less closely approximated, leaving space for the material to occupy. More particularly, in FIG. 18 and FIG. 20, the second front 252 and the first back 261 are less closely approximated; likewise, the first front 251 and the fourth back 264. Feed material tends to occupy the spaces where fronts are not closely overlapping backs and where flights are not closely overlapping shafts. In such spaces, the rotation of the augers tends to mix the feed material while at the same time conveying the feed material longitudinally in the direction of longitudinal travel of the flights.

With reference to the THIRD EXEMPLARY EMBODIMENT, it should be understood that, in a manner analogous to that described with reference to the FIRST EMBODIMENT and FIGS. 11-13, the first ends of the shafts are geared together in a gearbox having a drive and a motor. The ten-auger conveyor, like the four-auger conveyor, is enclosed within a housing having a supportive first bulkhead and a supportive second bulkhead. The gearbox is located proximate the first bulkhead. The motor is mounted on the drive, which is mounted on the gearbox. First ends of shafts extend from the first bulkhead to the gearbox. The gears engaged to drive each shaft at a 1:1 rate of rotation relative to the other shafts and to index each shaft at a rotational position relative to adjacent shafts to maintain clearances C between flights where the flights are closely approximated. As with the FIRST EMBODIMENT, all shafts are geared and additional drives may be added.

With reference to embodiments of the present invention generally, the self-cleaning function is accomplished either in a polar array of augers or in a rectangular array of augers, provided that the correct relationship is maintained between pitch, flight thickness, clearance, and the number of augers.

Figure 22:
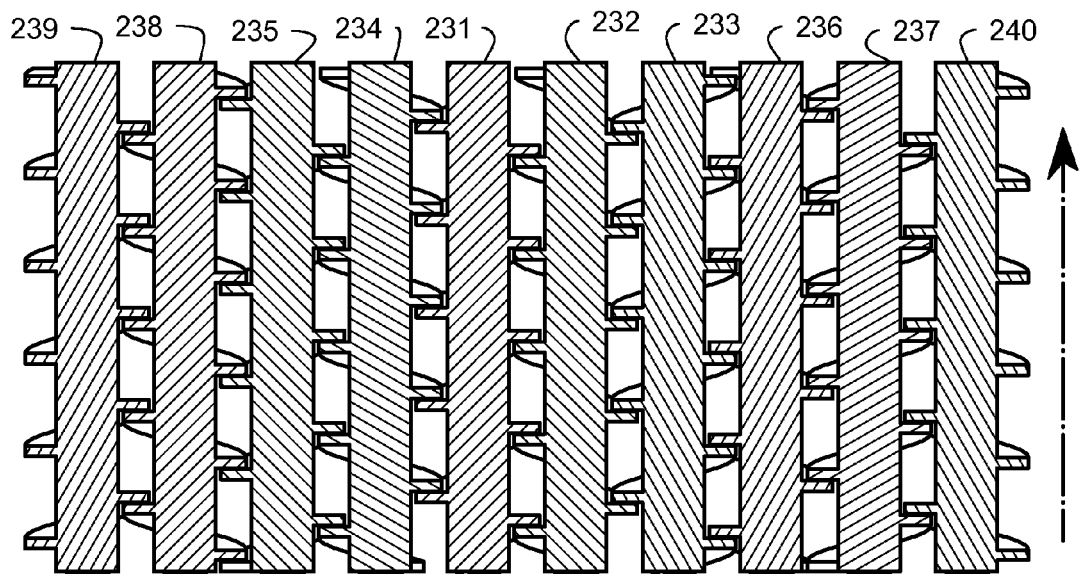
FIG. 22 is is a sectional view of a FOURTH EXEMPLARY EMBODIMENT EMBODIMENT of the self-cleaning conveyor in accordance with the present invention.

FIG. 22 is a sectional view of a FOURTH EXEMPLARY EMBODIMENT EMBODIMENT of the self-cleaning conveyor in accordance with the present invention, similar to the THIRD EXEMPLARY EMBODIMENT in the number, configuration and interrelation of flights, but different in pitch. In this FOURTH EXEMPLARY EMBODIMENT, the value of n is 8. In this view, the reference numbering of FIG. 20 is retained. Considered in relation to the THIRD EXEMPLARY EMBODIMENT, the FOURTH EXEMPLARY EMBODIMENT demonstrates that there are more than one allowable pitch value in this rectangular 10-auger conveyor.

Figure 23:
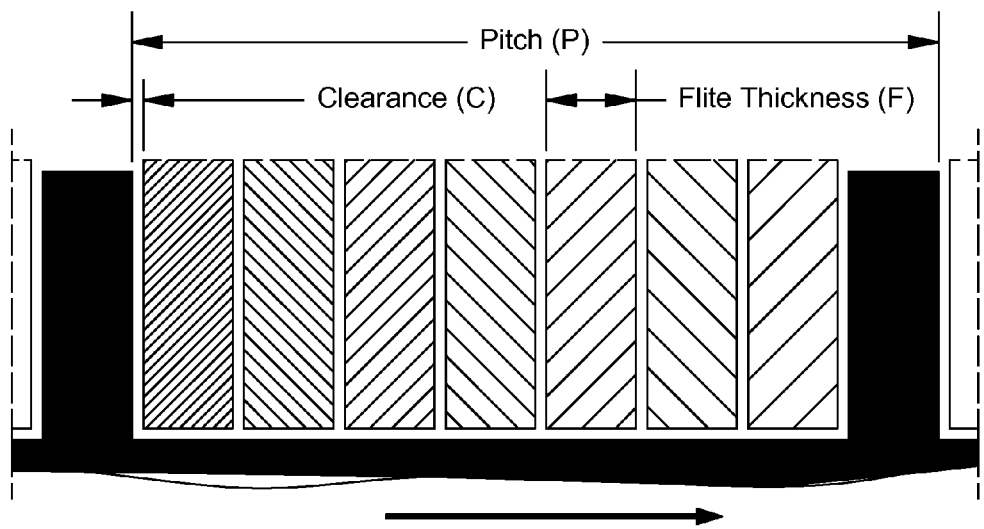
FIG. 23 is a schematic diagram of how the flight thicknesses and clearances of the flights in the embodiment of FIG. 22 add up.

FIG. 23 is a schematic diagram of how the flight thicknesses and clearances of the flights in the embodiment of FIG. 22 add up. T=10. P=8(T+C). Eight augers are intermeshed in the array of 10 augers of pitch P=8(T+C) plus an additional pair of the same pitch. In normal operation in accordance with the present invention, adjacent augers do not drive one another by means of contact between flights, nor do the flights impinge on one another. Rather, with reference to any pair of flights under consideration, there is a clearance between the front of each flight and the back of the flight with which it is intermeshed. It should be recalled that this clearance is maintained because the shafts of all ten augers are geared together. It will be appreciated that, in order for all ten flights to be mutually intermeshed in pairs with P=n(T+C) with n=8 without impinging, the thicknesses and clearances add up so that the sum any 8 adjacent augers equals the pitch P. Thus, the sum of all the flight thicknesses, each referred to as F, for this array of n flights, n being 8 in this embodiment, plus all the clearances, each referred to as C in this embodiment, is referred to as the pitch, P. This relationship among P, F, C, and n is expressed as P=n(F+C). In this embodiment, n=8. Therefore, P=8(F+C). In FIG. 23, the pitch is shown as the sum of the first flight thickness and clearance, the second flight thickness and clearance, the third flight thickness and clearance, the fourth flight thickness and clearance, the fifth flight thickness and clearance, the sixth flight thickness and clearance, the seventh flight thickness and clearance and the eighth flight thickness and clearance.

Figure 24:
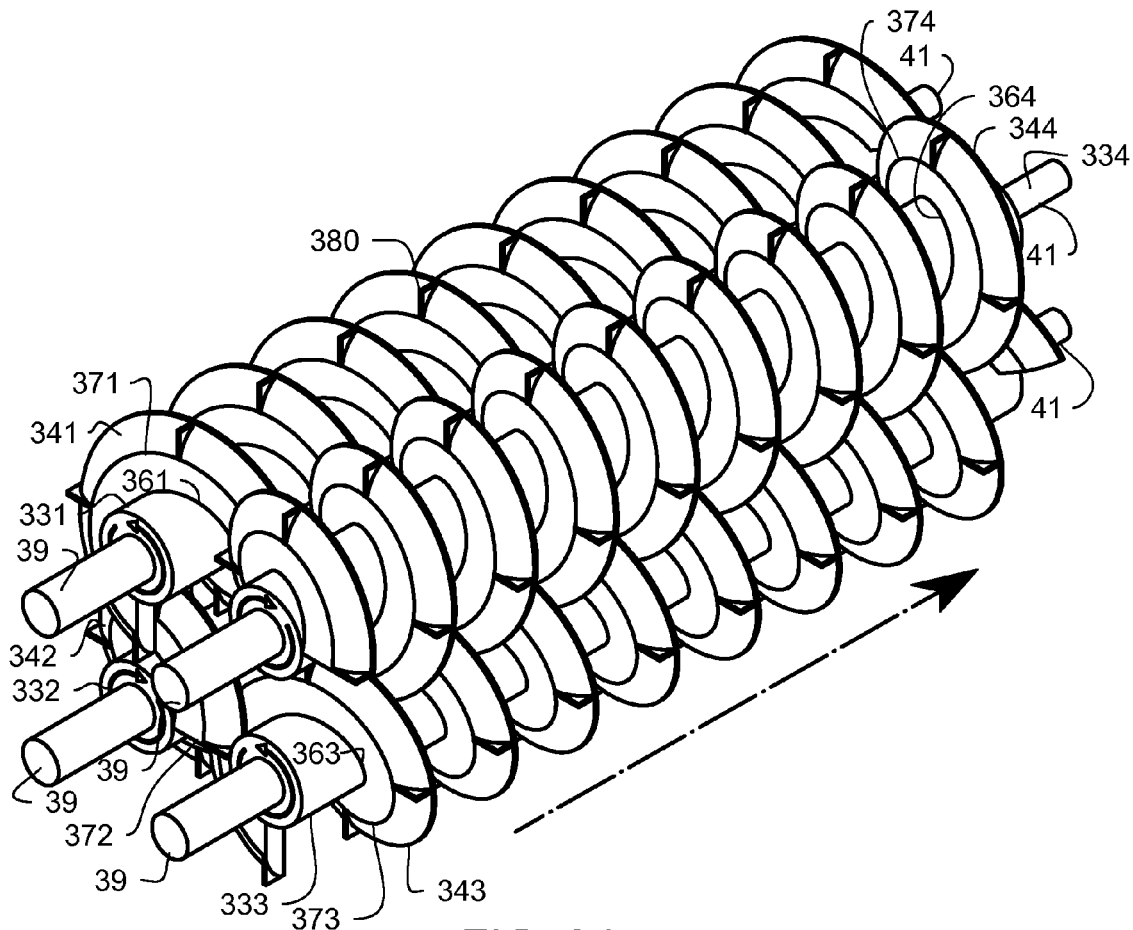
FIG. 24 is a perspective view of a FIFTH EXEMPLARY EMBODIMENT EMBODIMENT of the self-cleaning conveyor in accordance with the present invention.

FIG. 24 is a perspective view of a FIFTH EXEMPLARY EMBODIMENT EMBODIMENT of the self-cleaning conveyor in accordance with the present invention, shown generally at 20, similar to the FIRST EXEMPLARY EMBODIMENT in the number, configuration and interrelation of flights, but differing in how the flights are formed. This four-auger conveyor has first through fourth shafts 331-334, first through fourth flights 341-344, and first through fourth backs 361-364 (fronts not being visible in this view). In this FOURTH EXEMPLARY EMBODIMENT, the first through fourth backs 361-364 have coined back surface portions 371-374 from each of which project a plurality of radially-extending, backward-extending tabs 380 (here, spaced evenly at 90-degree intervals in azimuth). The coined back surface portions 371-374 provide the advantage of a space internal to the flight, within which a heat transfer medium can be circulated to heat or cool the feed material via the flight. Also advantageously, the tab projects to within a close enough approximation to the opposing front that the tab sweeps feed material away from the opposing front, which might otherwise not be reached by the coined back surface portion. Also advantageously, the tab projects radially as well as longitudinally and contributes to sweeping feed material from an adjacent shaft when it passes in close proximity to the shaft. However, coined back surface portions 371-374 do not easily clean the closely approximated fronts 351-354. The tabs 380 project to within a predetermined tab clearance of closely approximated fronts 351-354. In use, the tabs 389 sweep feed material away from the closely approximated fronts 351-354.

Figure 25:
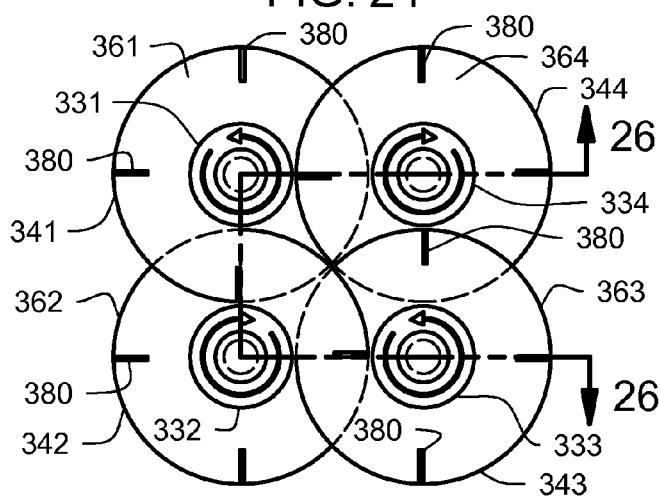
FIG. 25 is an end view of the embodiment of FIG. 24.

FIG. 25 is an end view of the embodiment of FIG. 24 showing first through fourth shafts 331-334, first through fourth flights 341-344, first through fourth backs 361-364 with tabs 380 (coined back surface portions are not easily depicted in this view).

Figure 26:
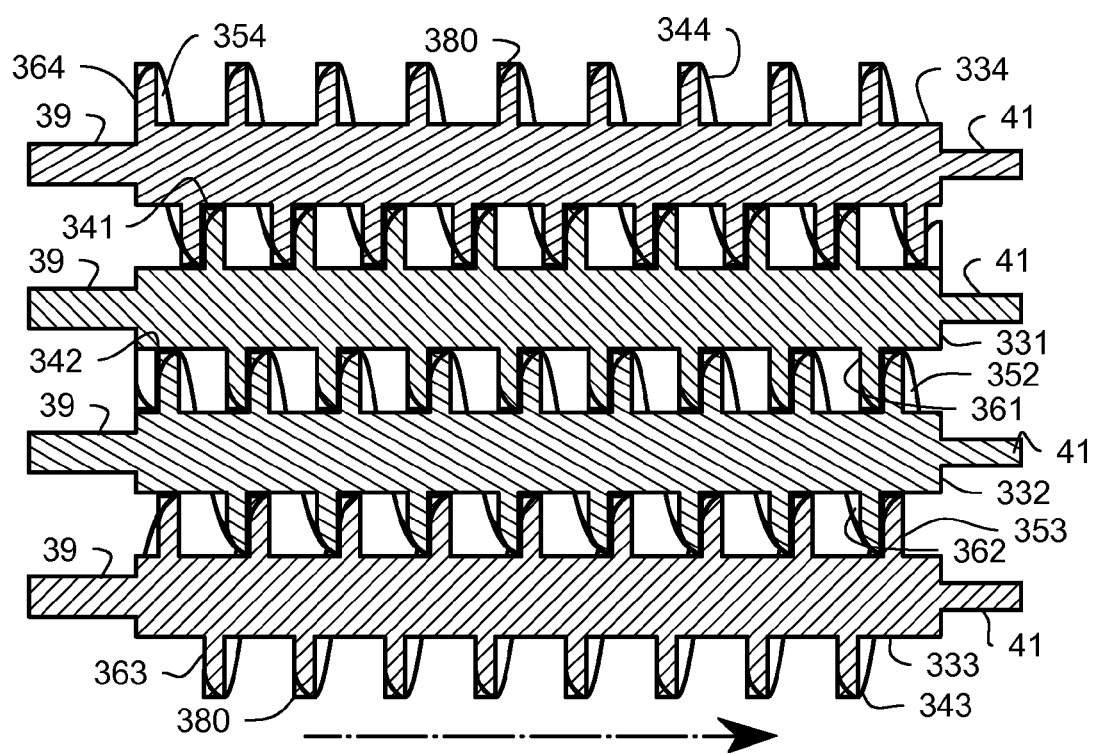
FIG. 26 is a sectional view of the embodiment of FIG. 24 along section lines 26-26 in FIG. 24.

FIG. 26 is a sectional view of the embodiment of FIG. 24 along section lines 26-26 in FIG. 24, showing first through fourth shafts 331-334, first through fourth flights 341-344, first through fourth fronts 351-354, and first through fourth backs 361-364 with first through fourth coined back surface portions 371-374 and tabs 380. It will be appreciated that the tabs 380, projecting toward the closely approximated fronts 351-354, tend to sweep feed material away from the fronts 351-354.

With reference to the embodiments of the invention generally, it will be remembered that the pitch of the array, the number of augers in the array, the clearances between intermeshed flights, and the flight thickness must satisfy specific requirements in order to keep the flights intermeshed so that all flight faces are cleaned. In designing a conveyor for a given installation in accordance with the present invention, the number, diameters, flight thicknesses, clearance, speed and arrangement (polar or rectangular) of the augers are often determined with reference to requirements, materials and conditions; then, the pitch is determined based on these data. Accordingly, it becomes necessary to determine what pitch values are allowable and then to select one value from among the allowable values. Table 1 below summarizes the relationships between pitch and these other variables.

For a RECTANGULAR ARRAY of helical flights all of which are intermeshed in accordance with the present invention, all have the same pitch and clearance, and all rotate at the same speed without interference between the intermeshed faces, the following conditions apply.

To accomplish self-cleaning in a rectangular array of helical flights arranged a rectangular array, the following definitions apply:

T=Total number of intermeshed flights; T must be divisible by 2 and result in an integer (n/2=i);
n=number of augers used in a pitch calculation;
P=the minimum pitch, the maximum pitch, or any workable arrangement of intermediate pitches;
Pmn=Minimum pitch;
Pmx=Maximum pitch;
I=Intermediate pitches;
F=flight thickness;
C=Clearance between intermeshed helicoil faces;

Relationships are as follows:

The minimum pitch is equal to 4(F+C);

For a rectangular array the maximum pitch is Pmx=n(F+C);

For a rectangular array to have an intermediate pitch the number of augers in a pitch has to be 6 or more.

For a rectangular array to have an intermediate pitch, it must have at least 6 augers.

For an intermediate pitch I, the number n can be any even number which is at least 2 greater than the value of n that the minimum pitch Pmn is derived from or is at least 2 lesser than the value of n that the maximum pitch Pmx is derived from. As previously stated, P=n(F+C) or, in the case of intermediate pitch, 1=n(F+C).

Derived formulas for determining the rotational advancement required to bring the augers into self cleaning position with a rectangular array of augers:

In any system of flights having one common value of pitch P, the number of flights n=P/(F+C).

The relative rotational advancement of each flight relative to the first flight in the array is 360°/n.

A 4-auger rectangular array comprises 2 pair of flights. The minimum pitch Pmn=4(F+C) with a reference position rotation of 90°. The maximum pitch Pmx=4(F+C) with a reference position rotation of 90°.

A 6-auger rectangular array comprises 3 pair of flights. The minimum pitch Pmn=4(F+C) with a reference position rotation of 90°. The maximum pitch Pmx=6(F+C) with a reference position rotation of 60°.

An 8-auger rectangular array comprises 4 pair of flights. The minimum pitch Pmn=4(F+C) with a reference position rotation of 90°. The maximum pitch Pmx=8(F+C) with a reference position rotation of 45°. Also allowable is an intermediate pitch I=6(F+C) with a reference position rotation of 60°.

A 10-auger rectangular array comprises 5 pair of flights. The minimum pitch Pmn=4(F+C) with a reference position rotation of 90°. The maximum pitch Pmx=10(F+C) with a reference position rotation of 36°. Also allowable are intermediate pitch values I=(6 or 8)*(F+C) with reference position rotations of 60° and 45°, respectively.

A 12-auger rectangular array comprises 6 pair of flights. The minimum pitch Pmn=4(F+C) with a reference position rotation of 90°. The maximum pitch Pmx=12(F+C) with a reference position rotation of 30°. Also allowable are intermediate pitch valves I=(6, 8, or 10)*(F+C) with reference position rotations of 60°, 45° and 36°, respectively.

A 14-auger rectangular array comprises 7 pair of flights. The minimum pitch Pmn=4(F+C) with a reference position rotation of 90°. The maximum pitch Pmx=14(F+C) with a reference position rotation of 25.7°. Also allowable are intermediate pitch values I=6, 8, 10, or 12 (F+C) with reference position rotations of 60°, 45°, 36°, and 30°, respectively.

For a POLAR ARRAY of helical flights all of which are intermeshed in accordance with the present invention, all have the same pitch and clearance, and all rotate at the same speed without interference between the intermeshed faces, the following conditions apply:

The outside diameters of all the flights, the flight thickness, and the pitch must be identical for all flights in the array. The number of flights in the array is an even number. The minimum number of flights in a polar array is 6. Flights alternate in handedness and in direction of rotation. The front and back of each flight in the array experiences overlap with a back or front, as the case may be, of an adjacent flight.

The plane of approach for each flight is parallel at the overlap and remains this way during rotation.

As mentioned above, all augers are of the same pitch. The pitch is specific to the flight thickness, number of augers, and the clearance desired between overlapping surfaces. The pitch is calculated. Next, each flight is clocked, i.e., rotationally adjusted to a starting rotational position relative to the adjacent flights. The following formulas express how to calcuate the pitch and rotational advancement to achieve the desired results.

For calculating the pitch required to achieve self cleaning with a polar array of augers, the variables being defined as above, the relationships are as follows:

For a polar array, the minimum pitch Pmn=n(F+C), where n=the smallest number of a factor set, greater than or equal to 3, factored from T, the total number of augers.

For a polar array, the maximum pitch Pmx=T(F+C), note n/2=I as above.

For a polar array to have an intermediate pitch I, there must be factors of T where n is other than n≥3 (which was used for minimum pitch) or T (which was used for maximum pitch). Intermediate pitch I=n(F+C), n being selected from among these factors.

Table 1 appended to this application along with the drawing sheets expresses the relationships for a polar array of augers.

For determining the rotational advancement required to bring the flight into the clearance position with a polar array of augers, the following should be noted. In any system of flights having a given pitch value P, the number of augers n=pitch P divided by (F+C) and the relative rotational position of each helicoil in the array is 360°/n.

For example, in a 6 helicoil polar array, if n=3 and the first flight start position is at 0° at 12 o'clock in the polar array and each flight start position is rotated 120° off of the auger 0° position, then the second flight start position is 60° off of the 0°.

For a polar array to have an intermediate pitch, the number of augers in the array must be 12 or more and can be any even number exceeding the minimum number by 2 or being at least 2 less than the maximum. Derived values are as follows:

A 6-auger polar array comprises 3 pair of flights. The minimum pitch Pmn=3(F+C) With a reference position rotation of 90°. The maximum pitch, Pmx=6(F+C) with a reference position rotation of 60°.

An 8-auger polar array comprises 4 pair of flights. The minimum pitch Pmn=4(F+C) with a reference position rotation of 90°. The maximum pitch Pmx=8(F+C) with a reference position rotation of 45°.

A 10-auger polar array comprises 5 pair of flights. The minimum pitch Pmn=5(F+C) with a reference position rotation of 72°. The maximum pitch Pmx=10(F+C) with a reference position rotation of 36°.

A 12-auger polar array comprises 6 pair of flights. The minimum pitch Pmn=3(F+C) with a reference position rotation of 120°. The maximum pitch Pmx=12(F+C) with a reference position rotation of 30°. Also allowable is an intermediate pitch value I=6 (F+C) with a reference position rotation of 60°.

A 14-auger polar array comprises 7 pair of flights. The minimum pitch Pmn=7(F+C) with a reference position rotation of 51.4°. The maximum pitch Pmx=14(F+C) with a reference position rotation of 25.7°.

A 16-auger polar array comprises 8 pair of flights. The minimum pitch Pmn=4(F+C) with a reference position rotation of 90°. The maximum pitch Pmx=16(F+C) with a reference position rotation of 22.5°. Also allowable are intermediate pitch values I=(6, 8, 10, or 12)*(F+C) with reference position rotations of 60°, 45°, 36°, and 30°, respectively.

An 18-auger polar array comprises 9 pair of flights. The minimum pitch Pmn=3 (F+C) with a reference position rotation of 120°. The maximum pitch Pmx=18(F+C) with a reference position rotation of 20°. Also allowable are intermediate pitch values I=(6, 9, 12, or 15)*(F+C) with reference position rotations of 60°, 40°, and 30°, and 24° respectively.

As can be seen from the drawing figures and from the description, each embodiment of the conveyor in accordance with the present invention solves a problem by addressing a need the inventors identified for a multi-auger helicoid conveyor which cleans itself during operation.

While the specification describes particular embodiments of the present invention, those of ordinary skill can devise variations of the present invention without departing from the inventive concept.

Although specific embodiments have been illustrated and described herein, those of ordinary skill in the art will appreciate that any arrangement calculated to achieve same purposes can be substituted for the specific embodiments shown. This disclosure is intended to cover any and all adaptations or variations of various embodiments of the invention. It is to be understood that the above description has been made in an illustrative fashion, and not a restrictive one. Combinations of the above embodiments, and other embodiments not specifically described herein will be apparent to those of skill in the art upon reviewing the above description. The scope of various embodiments of the invention includes any other applications in which the above structures and methods are used. Therefore, the scope of various embodiments of the invention should be determined with reference to the appended claims, along with the full range of equivalents to which such claims are entitled.

In the foregoing description, if various features are grouped together in a single embodiment for the purpose of streamlining the disclosure, this method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims, and such other claims as may later be added, are hereby incorporated into the description of the embodiments of the invention, with each claim standing on its own as a separate preferred embodiment.

We claim:

1. A self-cleaning conveyor, comprising:
   a plurality of augers, each of said augers having a flight wound helically about an axis,
   each of said flights being a member of a pair of flights, said pairs being at least two in number,
   flights of each pair being of opposite handedness and being mutually and counter-rotationally intermeshed with respective axes substantially parallel,
   at least one flight of each pair being mutually and counter-rotationally intermeshed with at least one flight of another pair,
   all of said flights having a common pitch,
   each of said flights having a front and a back, said front being approximated at a predetermined first clearance, as projected onto said axes, from a back of another of said flights, said back being approximated at said first clearance from a front of another of said flights,
   all of said plurality of flights being geared together so as to be rotatable at a common speed and so as to maintain said predetermined first clearance.

2. The self-cleaning conveyor of claim 1, having a plurality of shafts, each flight being coiled about one of said shafts, each flight having a periphery, and as to each pair of flights, each of said peripheries thereof intrudes to within a predetermined second clearance of the adjacent shaft thereof.

3. The conveyor of claim 1,
   a plurality of said pairs of said flights forming a polar array of T mutually intermeshed flights comprising n/2 pair of said n mutually intermeshed flights,
   all of said flights having a common thickness F as projected upon said axis,
   said first clearance, as projected upon said axis, being denominated C,
   said pitch P having a maximum pitch value Pmx, a minimum pitch value Pmn or an intermediate pitch value I,
   said variables T, F, C, Pmx, Pmn and I obeying the mathematical relationships (a), (b) and (c) as follows:

$$Pmn = n(F+C), \tag{a}$$

n being the smallest number of a factor set, greater than or equal to 3, factored from T, the total number of flights;

$$Pmx = T(F+C), \tag{b}$$

TABLE 1

Pitch Calculations

| | | | | | | | |
|---|---|---|---|---|---|---|---|
| (T) Total Number of Augers in Polar Array | 6 | 8 | 10 | 12 | 14 | 16 | 18 |
| (F) Helicoil Flight Thickness | 1 | 1 | 1 | 1 | 1 | 1 | 1 |
| (C) Helicoil overlapping face Clearance | 0.125 | 0.125 | 0.125 | 0.125 | 0.125 | 0.125 | 0.125 |
| Factor Set | (1 × 6) (2 × 3) | (1 × 8) (2 × 4) | (1 × 10) (2 × 5) | (1 × 12) (2 × 6) (3 × 4) | (1 × 14) (2 × 7) | (1 × 16) (2 × 8) (4 × 4) | (1 × 18) (2 × 9) (3 × 6) |
| (n) smallest number of factor set, >=3 | 3 | 4 | 5 | 3 | 7 | 4 | 3 |
| (Pmn) Minimum Helicoil Pitch | 3.375 | 4.5 | 5.625 | 3.375 | 7.875 | 4.5 | 3.375 |
| (Pmx) Maximum Helicoil Pitch | 6.75 | 9 | 11.25 | 13.5 | 15.75 | 18 | 20.25 |
| (I) Intermediate Pitches | NA | NA | NA | 4.5 6.75 | | 9 | 6.75, 10.125 |

T being a positive number evenly divisible by 2; and $$I = n(F+C), \qquad (c).$$

there being factors of T, n being selected from among said factors of (a) above other than n≥3 (used for min pitch) or T (used for max pitch).

4. The conveyor of claim 1, a plurality of said pairs of said flights forming a rectangular array of T mutually intermeshed flights comprising n/2 pair of said n mutually intermeshed flights, all of said flights having a common thickness F as projected upon said axis, said first clearance, as projected upon said axis, being denominated C, said pitch P having a maximum pitch value Pmx, a minimum pitch value Pmn or an intermediate pitch value I, said variables T, F, C, Pmx, Pmn and I obeying the mathematical relationships (a), (b) and (c) as follows:

(a). Pmn=4(F+C);

(b). Pmx=n(F+C), n being a positive number evenly divisible by 2; and (c). I=n(F+C), n being a positive number evenly divisible by 2, greater than 6, and being at least 2 greater than the minimum value of n or being at least 2 less than the maximum value of n in an array of augers on which the pitch is based.

5. The self-cleaning conveyor of claim 1, at least one of said flights having a coined surface portion and a tab projecting longitudinally and radially from said coined surface portion, said tab projecting to a predetermined third clearance from said front of said flight with which said at least one flight is intermeshed.

\* \* \* \* \*